(12) United States Patent
Lundberg et al.

(10) Patent No.: US 8,225,687 B2
(45) Date of Patent: Jul. 24, 2012

(54) HYDRAULIC CONTROL SYSTEMS FOR DUAL CLUTCH TRANSMISSIONS

(75) Inventors: Philip C. Lundberg, Keego Harbor, MI (US); Bret M. Olson, Whitelake, MI (US)

(73) Assignee: GM Global Technology Operations LLC, Detroit, MI (US)

(*) Notice: Subject to any disclaimer, the term of this patent is extended or adjusted under 35 U.S.C. 154(b) by 507 days.

(21) Appl. No.: 12/556,462

(22) Filed: Sep. 9, 2009

(65) Prior Publication Data

US 2011/0056314 A1 Mar. 10, 2011

(51) Int. Cl.
*F16H 3/08* (2006.01)

(52) U.S. Cl. .......................................... 74/330

(58) Field of Classification Search ................. 475/116, 475/123; 74/473.11, 300, 331, 335; 477/168, 477/79, 77, 51, 130; 192/3.57, 3.58, 85.63, 192/48.9
See application file for complete search history.

(56) References Cited

U.S. PATENT DOCUMENTS

| | | | |
|---|---|---|---|
| 3,834,499 A | 9/1974 | Candellero et al. | |
| 4,653,352 A | 3/1987 | Nakao et al. | |
| 4,944,202 A | 7/1990 | Gierer | |
| 5,441,459 A | 8/1995 | Inukai et al. | |
| 6,698,304 B2 | 3/2004 | Gierling et al. | |
| 6,715,597 B1 | 4/2004 | Buchanan et al. | |
| 6,789,658 B2 | 9/2004 | Busold et al. | |
| 6,827,191 B2 | 12/2004 | Kuhstrebe | |
| 6,883,394 B2 | 4/2005 | Koenig et al. | |
| 6,941,830 B2 | 9/2005 | Ibamoto et al. | |
| 7,300,375 B2 | 11/2007 | Petrzik | |
| 7,401,689 B2 | 7/2008 | Hegerath et al. | |
| 7,464,617 B2 | 12/2008 | Baldascini et al. | |
| 7,464,618 B2 | 12/2008 | Mohlmann et al. | |
| 7,472,616 B2 | 1/2009 | Dreher et al. | |
| 7,478,572 B2 | 1/2009 | Maten et al. | |
| 7,487,866 B2 | 2/2009 | Kruse et al. | |
| 7,591,203 B2 | 9/2009 | Ochi et al. | |
| 2001/0036878 A1 | 11/2001 | Itou et al. | |
| 2002/0060113 A1 | 5/2002 | Harries | |
| 2002/0119864 A1 | 8/2002 | Harries | |
| 2002/0193199 A1* | 12/2002 | Jang .............................. 475/116 |
| 2003/0075408 A1 | 4/2003 | Alfredsson | |
| 2003/0226416 A1 | 12/2003 | Umemoto et al. | |
| 2004/0038765 A1 | 2/2004 | Fujimine et al. | |
| 2005/0067251 A1 | 3/2005 | Braford et al. | |
| 2005/0107214 A1 | 5/2005 | Koenig | |
| 2007/0175726 A1 | 8/2007 | Combes et al. | |
| 2008/0207392 A1 | 8/2008 | Staudinger et al. | |
| 2008/0210032 A1 | 9/2008 | Uberti et al. | |
| 2008/0223683 A1 | 9/2008 | Grethel | |

(Continued)

FOREIGN PATENT DOCUMENTS

DE 2141564 A1 2/1973

(Continued)

*Primary Examiner* — David D Le
*Assistant Examiner* — Stacey Fluhart

(57) ABSTRACT

The present invention comprehends a plurality of embodiments of a hydraulic control system for various configurations of dual clutch transmissions. The hydraulic control systems all include a regulated source of pressurized hydraulic fluid including an electric pump, a filter and an accumulator, a pair of pressure control valves and a branching hydraulic circuit including pressure or flow control valves, spool or logic valves and two position valves which collectively supply and exhaust hydraulic fluid from a plurality of shift actuators. The actuators are connected to shift rails which include shift forks and are slidable to engage synchronizers and positive clutches associated with the various gear ratios.

19 Claims, 14 Drawing Sheets

U.S. PATENT DOCUMENTS

| | | |
|---|---|---|
| 2009/0000897 A1 | 1/2009 | Staudinger et al. |
| 2009/0151495 A1 | 6/2009 | Garabello et al. |
| 2009/0157271 A1 | 6/2009 | Garabello et al. |
| 2011/0028271 A1* | 2/2011 | Whitmarsh et al. ............ 477/86 |
| 2011/0056315 A1* | 3/2011 | Lundberg et al. .......... 74/473.11 |

FOREIGN PATENT DOCUMENTS

| | | |
|---|---|---|
| DE | 4117736 C1 | 5/1992 |
| DE | 4320353 A1 | 1/1994 |
| DE | 29714652 U1 | 10/1997 |
| DE | 19921301 A1 | 11/1999 |
| DE | 19849488 A1 | 5/2000 |
| DE | 19931973 A1 | 1/2001 |
| DE | 10125172 A1 | 11/2002 |
| DE | 10134115 A1 | 1/2003 |
| DE | 10134115 A1 | 1/2003 |
| DE | 10243282 A1 | 4/2004 |
| DE | 102005029963 A1 | 2/2007 |
| DE | 102005029964 A1 | 3/2007 |
| DE | 102008008454 A1 | 9/2008 |
| DE | 102008058692 A1 | 6/2009 |
| EP | 0477564 A2 | 4/1992 |
| EP | 1400733 A2 | 3/2004 |
| EP | 1433976 A1 | 6/2004 |
| EP | 1469235 A1 | 10/2004 |
| EP | 1519082 A1 | 3/2005 |
| EP | 1589262 A1 | 10/2005 |
| EP | 1645786 A2 | 4/2006 |
| EP | 1767824 A1 | 3/2007 |
| EP | 2151586 A2 | 2/2010 |
| FR | 2808065 A1 | 10/2001 |
| JP | 58102851 A | 8/1983 |
| JP | 2007010145 A | 1/2007 |
| WO | WO9705410 A1 | 2/1997 |
| WO | WO9919644 A1 | 4/1999 |
| WO | WO2004097265 A1 | 11/2004 |
| WO | WO2009037170 A1 | 3/2009 |
| WO | WO2010028745 A2 | 3/2010 |

* cited by examiner

HYDRAULIC CONTROL SYSTEMS FOR DUAL CLUTCH TRANSMISSIONS

FIELD

The present disclosure relates to hydraulic control systems and more particularly to hydraulic control systems and their components for dual clutch transmissions.

BACKGROUND

The statements in this section merely provide background information related to the present disclosure and may or may not constitute prior art.

In automotive transmission art, the dual clutch transmission (DCT) is a relatively new concept. A typical dual clutch transmission configuration includes a pair of mutually exclusively operating input clutches which drive a pair of input shafts. The input shafts may be disposed on opposite sides of an output shaft or may be disposed concentrically between spaced-apart output shafts. One of each of a plurality of pairs of constantly meshing gears which provide the various forward and reverse gear ratios is freely rotatably disposed on one of the shafts and the other of each pair of gears is coupled to one of the other shafts. A plurality of synchronizer clutches selectively couple the freely rotatable gears to the associated shaft to achieve forward and reverse gear ratios. After the synchronizer clutch is engaged, the input clutch associated with the input shaft having the engaged synchronizer clutch is applied to transmit power through the transmission. Reverse gear is similarly achieved except that it includes an additional (idler) gear to provide torque reversal.

Dual clutch transmissions are known for their sporty, performance oriented operating characteristics which mimic those of a conventional mechanical (manual) transmission. They also typically exhibit good fuel economy due to their good gear mesh efficiency, ratio selection flexibility, reduced clutch losses and the lack of a torque converter.

There are several design considerations unique to dual clutch transmissions. For example, because of heat generated during clutch slip, the input clutches must be of relatively large size. Furthermore, such heat generation typically requires correspondingly larger and more complex cooling components capable of dissipating relatively large quantities of heat. Finally, because such transmissions typically have many sets of axially aligned, meshing gears, their overall length may limit their use to certain vehicle designs.

Control of the input clutches and selection and engagement of a particular gear by translation of a synchronizer and associated positive clutch is typically achieved by a hydraulic control system. Such a system, itself under the control of an electronic transmission control module (TCM), includes hydraulic valves and actuators which engage the synchronizers and gear clutches. Optimum operating efficiency and thus fuel efficiency and minimal heat generation can be achieved by designing such hydraulic control systems to exhibit low leakage and positive control characteristics. The present invention is so directed.

SUMMARY

The present invention comprehends a plurality of embodiments of a hydraulic control system for various configurations of dual clutch transmissions having two or three countershafts, a third, idler shaft and four or five shift rails and hydraulic actuators. The hydraulic control systems all include a regulated source of pressurized hydraulic fluid including an electric pump, a filter and an accumulator, a pair of pressure control valves and a branching hydraulic circuit including pressure or flow control valves, spool or logic valves and two position valves which collectively supply and exhaust hydraulic fluid from a plurality of shift actuators. The actuators are connected to shift rails which include shift forks and are slidable to engage synchronizers and positive clutches associated with the various gear ratios.

Several of the embodiments define two essentially independent control systems supplied with hydraulic fluid through two independently operating valves. The two independent control systems are associated with respective transmission countershafts and, generally speaking, one countershaft is associated with the even-numbered gears (second, fourth, etc.) and the other countershaft is associated with the odd-numbered gears (first, third, etc.). When the transmission is operating in a normal ascending or descending gear selection sequence, this configuration permits pre-staging or pre-selection of a gear associated with one countershaft while a gear associated with the other countershaft is engaged and transmitting torque. Furthermore, if a component or components associated with one countershaft fail, the other countershaft and the alternating (i.e., first, third, fifth) selection of gear ratios it provides will still be fully operational—a highly desirable failure mode.

The hydraulic control systems according to the present invention are less complex and expensive relative to competing systems, provide improved control through interconnected logic valves which reduce the likelihood of engaging a wrong or multiple gears and provide reduced energy consumption by allowing shut-down of portions of the control system during steady state operation. Certain embodiments of the control system utilize pairs of pressure or flow control valves to control pressure on both sides of shift actuator pistons which provides better control and improved shifts.

Thus it is an object of the present invention to provide a hydraulic control system for a dual clutch automatic transmission.

It is a further object of the present invention to provide a hydraulic control system for a dual clutch transmission having a plurality of spool or logic valves and hydraulic actuators.

It is a still further object of the present invention to provide a hydraulic control system for a dual clutch transmission having a plurality of two position solenoid valves, spool valves and hydraulic actuators.

It is a still further object of the present invention to provide a hydraulic control system for a dual clutch transmission having a plurality of flow or pressure control valves, two position solenoid valves, logic or spool valves and hydraulic actuators.

It is a still further object of the present invention to provide a hydraulic control system for a dual clutch transmission comprising two essentially independent hydraulic systems, each associated with a respective transmission countershaft.

It is a still further object of the present invention to provide a hydraulic control system for a dual clutch transmission having a pair of input clutches associated with a pair of concentric input shafts and a pair of countershafts.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
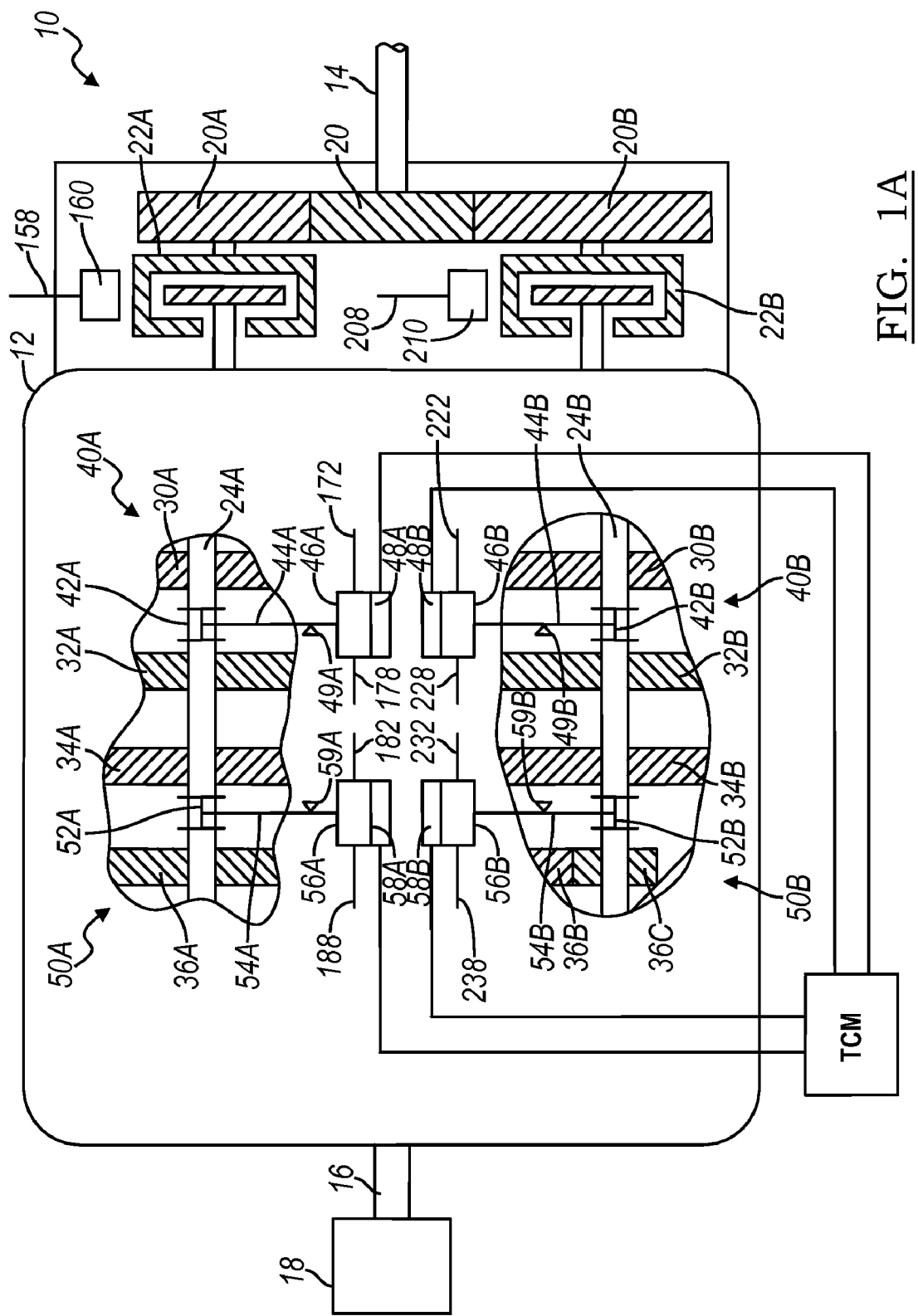
FIG. 1A is a pictorial view of an exemplary dual clutch automatic transmission with portions broken away incorporating a hydraulic control system according to the present invention having four shift actuator assemblies.

With reference now to FIG. 1A, a typical and exemplary dual clutch automatic transmission having four shift actuators and incorporating the present invention is illustrated and generally designated by the reference number 10. The dual clutch transmission 10 includes a typically cast, metal housing 12 which encloses and protects the various components of the transmission 10. The housing 12 includes a variety of apertures, passageways, shoulders and flanges which position and support these components. The transmission 10 includes an input shaft 14 which receives motive power from a prime mover (not illustrated) such as an internal combustion gas or Diesel engine or a hybrid or electric power plant and a single or double output shaft 16 which is coupled to a single or double output assembly 18 which may include, for example, propshafts, differential assemblies and drive axles. The input shaft 14 is coupled to and drives an input drive gear 20 which is in constant mesh with and drives a pair of driven gears, a first driven gear 20A and a second driven gear 20B. A variety of torque transmitting, rotating devices can be used and are within the scope of this invention. The driven gears 20A and 20B, in turn, drive a pair of dry input clutches, a first input clutch 22A and a second input clutch 22B which are mutually exclusively engaged to provide drive torque to a respective pair of layshafts or countershafts, a first countershaft shaft 24A and a second countershaft 24B.

Freely rotatably disposed about each of the countershafts 24A and 24B are a plurality of helical or spur gears (not illustrated) which are in constant mesh with helical or spur gears which are secured to and rotate with the output shaft 16. A first driven gear on the output shaft 16 meshes with both a drive gear 30A on the first countershaft 24A and a drive gear 30B on the second countershaft 24B. A second driven gear on the output shaft 16 meshes with both a drive gear 32A on the first countershaft 24A and a drive gear 32B on the second countershaft 24B. A third driven gear on the output shaft 16 meshes with both a drive gear 34A on the first countershaft 24A and a drive gear 34B on the second countershaft 24B. A fourth driven gear in the output shaft 16 meshes with both a drive gear 36A on the first countershaft 24A and an idler gear 36B. The idler gear 36B, in turn, meshes with a drive gear 36C the second countershaft 24B to provide torque reversal and thus reverse gear. Other numbers of gear meshes are within the scope of this invention.

Disposed between each adjacent pair of gears on each countershaft 24A and 24B is a shift actuator and synchronizer clutch assembly. Each shift actuator and synchronizer clutch assembly, in accordance with conventional practice, includes a synchronizer assembly which, when activated, synchronizes the speed of a gear to that of the countershaft and a positive clutch, such as a dog or face clutch, which positively connects or couples the gear to the countershaft. Thus, between the gears 30A and 32A on the first countershaft 24A is a first shift actuator and synchronizer clutch assembly 40A having a double, i.e., back-to-back, synchronizer clutch 42A which selectively and exclusively synchronizes and engages one of the gears 30A and 32A to the first countershaft 24A. The first synchronizer clutch 42A is bi-directionally translated by a first shift rail and fork assembly 44A which, in turn, is translated by a first shift actuator assembly 46A. The real time linear position of the first synchronizer clutch 42A and the first shift rail and fork assembly 44A is sensed by a first linear position sensor 48A which preferably provides a continuous, i.e., proportional, output to a transmission control module TCM indicating the present position of the first synchronizer clutch 42A.

Between the gears 34A and 36A on the first countershaft 24A is a second shift actuator and synchronizer clutch assembly 50A having a double, i.e., back-to-back, synchronizer clutch 52A which selectively and exclusively synchronizes and engages one of the gears 34A and 36A to the first countershaft 24A. The second synchronizer clutch 52A is bi-directionally translated by a second shift rail and fork assembly 54A which, in turn, is translated by a second shift actuator assembly 56A. The real time linear position of the second synchronizer clutch 52A and the second shift rail and fork assembly 54A is sensed by a second linear position sensor 58A which preferably provides a continuous, i.e., proportional, output to the transmission control module TCM indicating the present position of the second synchronizer clutch 52A.

Between the gears 30B and 32B on the second countershaft 24B is a third shift actuator and synchronizer clutch assembly 40B having a double, i.e., back-to-back, synchronizer clutch 42B which selectively and exclusively synchronizes and engages one of the gears 30B and 32B to the second countershaft 24B. The third synchronizer clutch 42B is bi-directionally translated by a third shift rail and fork assembly 44B which, in turn, is translated by a third shift actuator assembly 46B. The real time linear position of the third synchronizer clutch 42B and the third shift rail and fork assembly 44B is sensed by a third linear position sensor 48B which preferably provides a continuous, i.e., proportional, output to the transmission control module TCM indicating the present position of the third synchronizer clutch 42B.

Between the gears 34B and 36C on the second countershaft 24B is a fourth shift actuator and synchronizer clutch assembly 50B having a double, i.e., back-to-back, synchronizer clutch 52B which selectively and exclusively synchronizes and engages one of the gears 34B and 36C to the second countershaft 24B. The fourth synchronizer clutch 52B is bi-directionally translated by a fourth rail and fork assembly 54B which, in turn, is translated by a fourth actuator assembly 56B. The real time linear position of the fourth synchronizer clutch 52B and the fourth shift rail and fork assembly 54B is sensed by a fourth linear position sensor 58B which preferably provides a continuous, i.e., proportional, output to the transmission control module TCM indicating the present position of the fourth synchronizer clutch 52B. It should be understood that the linear position sensors 48A, 48B, 58A and 58B may be replaced with other sensors such as two or three position switches or open loop control with system characterization.

Additionally, a detent mechanism may be employed with each of the shift assemblies to assist obtaining and maintaining a given gear or speed ratio once it is selected and to assist obtaining and maintaining the synchronizer clutch in neutral, i.e., an unengaged position. Thus, a first detent assembly 49A may be operatively associated with the first shift actuator and synchronizer clutch assembly 40A. A second detent assembly 59A may be operatively associated with the second shift actuator and synchronizer clutch assembly 50A. A third detent assembly 49B may be operatively associated with the third shift actuator and synchronizer clutch assembly 40B and a fourth detent assembly 59B may be operatively associated with the fourth shift actuator and synchronizer clutch assembly 50B.

Figure 1B:
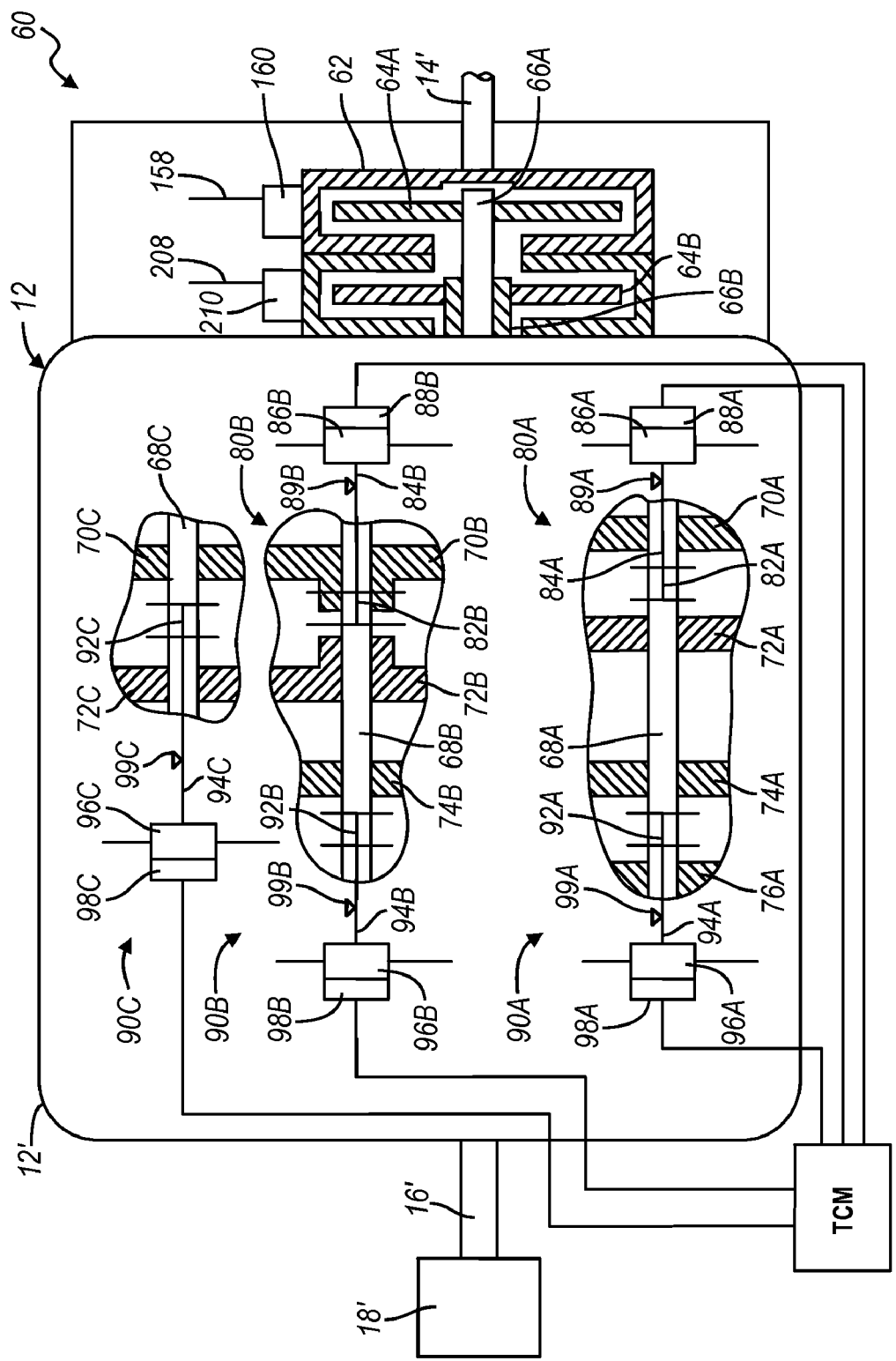
FIG. 1B is a pictorial view of an exemplary dual clutch automatic transmission with portions broken away incorporating a hydraulic control system according to the present invention having five shift actuator assemblies.

With reference to FIG. 1B, a second exemplary dual clutch automatic transmission incorporating the present invention is illustrated and generally designated by the reference number 60. The dual clutch transmission 60 includes a typically cast, metal housing 12' which encloses and protects the various components of the transmission 60. The housing 12' includes a variety of apertures, passageways, shoulders and flanges (not illustrated) which position and support the components of the transmission 60. The transmission 60 includes an input shaft 14' which receives motive power from a prime mover (not illustrated) such as an internal combustion gas or Diesel engine or a hybrid or electric power plant and a single or double output shaft 16' which drives a final drive assembly 18' which may include a propshaft, a differential and drive axles. The input shaft 14' is coupled to and drives a clutch housing 62. The clutch housing 62, in turn, drives a pair of concentrically disposed dry input clutches, a first input clutch 64A and a second input clutch 64B which are mutually exclusively engaged to provide drive torque to a respective pair of concentric input members, a first or inner input shaft 66A and a second or outer hollow input shaft or quill 66B.

Secured to and rotating with each of the input members 66A and 66B are a plurality of helical or spur gears (not illustrated) which are in constant mesh with helical or spur gears which are freely rotatably disposed on a first layshaft or countershaft 68A and a parallel, second layshaft or countershaft 68B. Adjacent and parallel to the second countershaft is a third layshaft or countershaft 68C. A first drive gear meshes with a first driven gear 70A on the first countershaft 68A. A second drive gear meshes with a second driven gear 72A on the first countershaft 68A. A third drive gear meshes with a third driven gear 74A on the first countershaft 68A. A fourth drive gear meshes with a fourth driven gear 76A on the first countershaft 68A. A fifth driven gear 70B on the second countershaft 68B meshes with a fifth drive gear 70C on the third countershaft 68C. The second drive gear also meshes with a sixth driven gear 72B on the second countershaft 68B which meshes with a seventh driven gear 72C on the third countershaft 68C. An eighth drive gear meshes with an eighth driven gear 74B on the second countershaft 68B.

Disposed either adjacent certain single gears or between adjacent pairs of gears on the countershafts 68A, 68B and 68C are synchronizer clutch assemblies. Each synchronizer clutch assembly, in accordance with conventional practice, includes a synchronizer assembly which, when activated, synchronizes the speed of a gear to that of the associated countershaft and a positive clutch, such as a dog or face clutch, which positively connects the gear to the shaft. Thus, between the driven gears 70A and 72A on the first countershaft 68A is a first shift actuator and synchronizer clutch assembly 80A having a double, i.e., back-to-back, first synchronizer clutch 82A which selectively and exclusively synchronizes and engages one of the gears 70A and 72A to the first countershaft 68A. The first synchronizer clutch 82A is bi-directionally translated by a first shift rail and fork assembly 84A which, in turn, is translated by a first shift actuator assembly 86A. The real time position of the first synchronizer clutch 82A and the first shift rail and fork assembly 84A is sensed by a first linear position sensor 88A which preferably provides a continuous, i.e., proportional, output signal to a transmission control module TCM indicating the position of the first synchronizer clutch 82A.

Between the fifth driven gear 70B and the sixth driven gear 72B on the second countershaft 68B is a second shift actuator and synchronizer clutch assembly 80B having a single synchronizer clutch 82B which synchronizes and couples the driven gears 70B and 72B together. The second synchronizer clutch 82B is bi-directionally translated by a second shift rail and fork assembly 84B which, in turn, is translated by a second shift actuator assembly 86B. The real time position of the second synchronizer clutch 82B and the second shift rail and fork assembly 84B is sensed by a second linear position sensor 88B which preferably provides a continuous, i.e., proportional, output signal to the transmission control module TCM indicating the position of the second synchronizer clutch 82B.

Between the driven gears 74A and 76A on the first countershaft 68A is a third shift actuator and synchronizer clutch assembly 90A having a double, i.e., back-to-back, third synchronizer clutch 92A which selectively and exclusively synchronizes and engages one of the gears 74A and 76A to the first countershaft 68A. The third synchronizer clutch 92A is bi-directionally translated by a third shift rail and fork assembly 94A which, in turn, is translated by a third shift actuator assembly 96A. The real time position of the third synchronizer clutch 92A and the third shift rail and fork assembly 94A is sensed by a third linear position sensor 98A which preferably provides a continuous, i.e., proportional, output signal to the transmission control module TCM indicating the position of the third synchronizer clutch 92A.

Adjacent the eighth driven gear 74B on the second countershaft 68B is a fourth shift actuator and synchronizer clutch assembly 90B having a single synchronizer clutch 92B which synchronizes and couples the eighth driven gear 74B to the second countershaft 68B. The fourth synchronizer clutch 92B is bi-directionally translated by a fourth shift rail and fork assembly 94B which, in turn, is translated by a fourth shift actuator assembly 96B. The real time position of the fourth synchronizer clutch 92B and the fourth shift rail and fork assembly 94B is sensed by a fourth linear position sensor 98B which preferably provides a continuous, i.e., proportional, output signal to the transmission control module TCM indicating the position of the fourth synchronizer clutch 92B.

Finally, between the fifth drive gear 70C and the seventh driven gear 72C on the third countershaft 68C is a fifth shift actuator and synchronizer clutch assembly 90C having a double, i.e., back-to-back, synchronizer clutch 92C which selectively and exclusively synchronizes and engages one of the gears 70C and 72C to the third countershaft 68C. The fifth synchronizer clutch 92C is bi-directionally translated by a fifth shift rail and fork assembly 94C which, in turn, is translated by a fifth shift actuator assembly 96C. The real time position of the fifth synchronizer clutch 92C and the fifth shift rail and fork assembly 94C is sensed by a fifth linear position sensor 98C which preferably provides a continuous, i.e., proportional, output signal to the transmission control module TCM indicating the position of the fifth synchronizer clutch 92C. It should be understood that the linear position sensors 88A, 88B, 98A, 98B and 98C may be replaced with other sensors such as two and three position switches or open loop control with system characterization.

Additionally, a detent mechanism may be employed with each of the shift assemblies to assist in obtaining and maintaining a gear or speed ratio once it is selected and to assist obtaining and maintaining a synchronizer clutch in neutral, i.e., an unengaged position. Thus, a first detent assembly 89A may be operatively associated with the first shift actuator and synchronizer clutch assembly 80A. A second detent assembly 89B may be operatively associated with the second shift actuator and synchronizer clutch assembly 80B. A third detent assembly 99A may be operatively associated with the third shift actuator and synchronizer clutch assembly 90A. A fourth detent assembly 99B may be operatively associated with the fourth shift actuator and synchronizer clutch assembly 90B and a fifth detent assembly 99C may be operatively associated with the fifth shift actuator and synchronizer clutch assembly 90C.

It will be appreciated that the transmission 60 illustrated and described above is laid out with four forward gears on one countershaft and the remaining (three) forward gears and reverse on two other countershafts. It is thus capable of providing seven forward speeds and reverse. Similar configurations, all deemed to be within the scope of this invention may, for example, include six forward speeds (or gears) and one or two reverse speeds (or gears) or five forward speeds and one or two reverse speeds.

It should be understood that while the present invention is directed to hydraulic control systems for dual clutch transmissions, such systems are typically controlled by sensor signals and memory, software and one or more microprocessors contained in a transmission control module TCM. Thus, the transmission control module TCM includes a plurality of inputs which receive data from, for example, the linear position sensors, and a plurality of outputs which control and modulate, for example, the positions of the clutches, shift rails and logic solenoid valves.

Just, as noted above, the transmission may include various numbers of forward and reverse speeds or gear ratios, various embodiments of the transmission may include four shift actuators and shift rails or five shift actuators and shift rails and single or double synchronizer clutch assemblies as described herein. Embodiments having four shift rails include four double synchronizer clutch assemblies, typically disposed in pairs on two countershafts, as illustrated in conjunction with the transmission 10 in FIG. 1A. Embodiments having five shift rails include two single and three double synchronizer clutch assemblies disposed on three countershafts, as illustrated in conjunction with the transmission 60 in FIG. 1B.

Figure 2A:
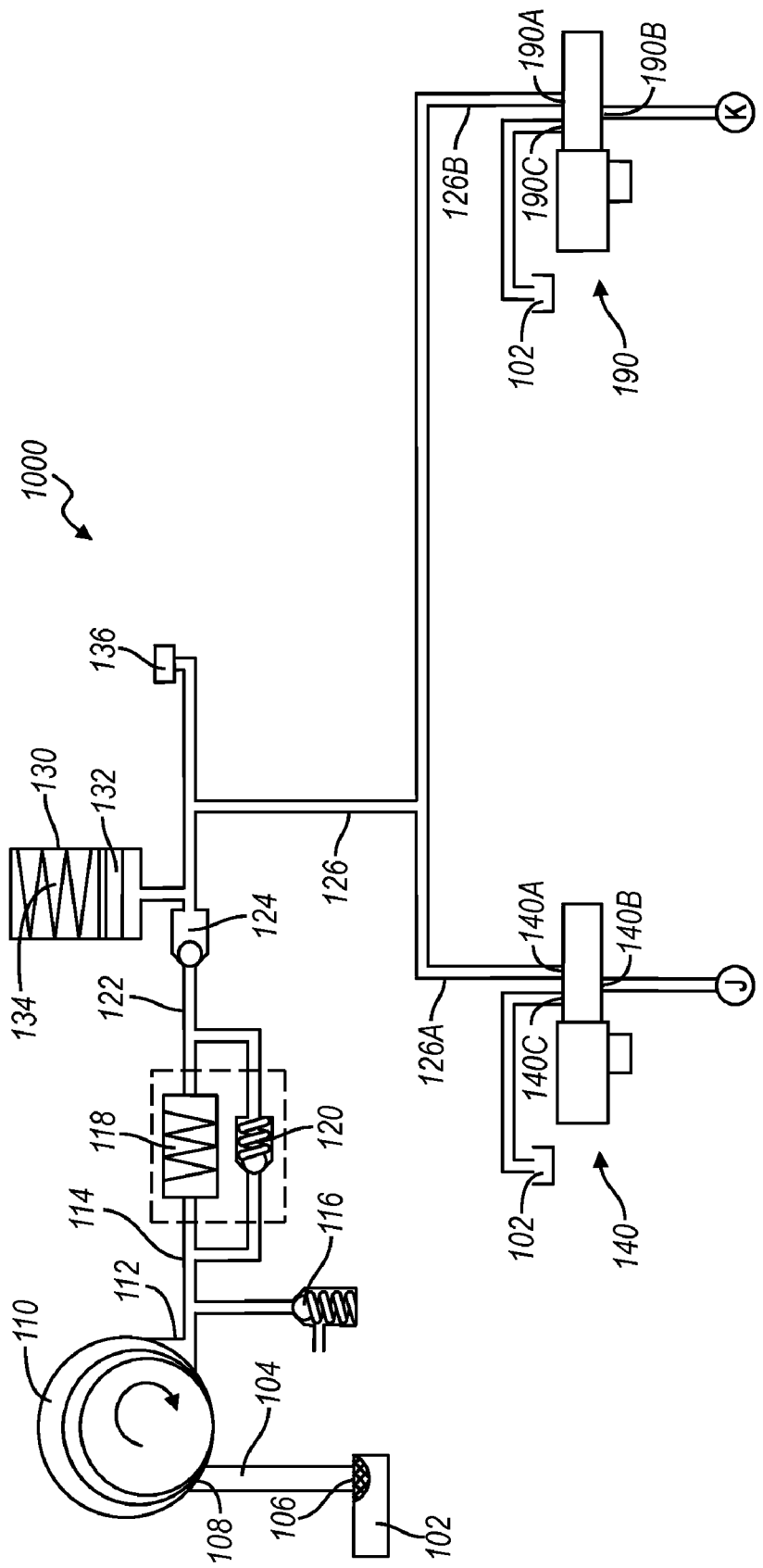
FIGS. 2A and 2B are schematic flow diagrams of a first embodiment of a hydraulic control system according to the present invention for a dual clutch automatic transmission.
Figure 2B:
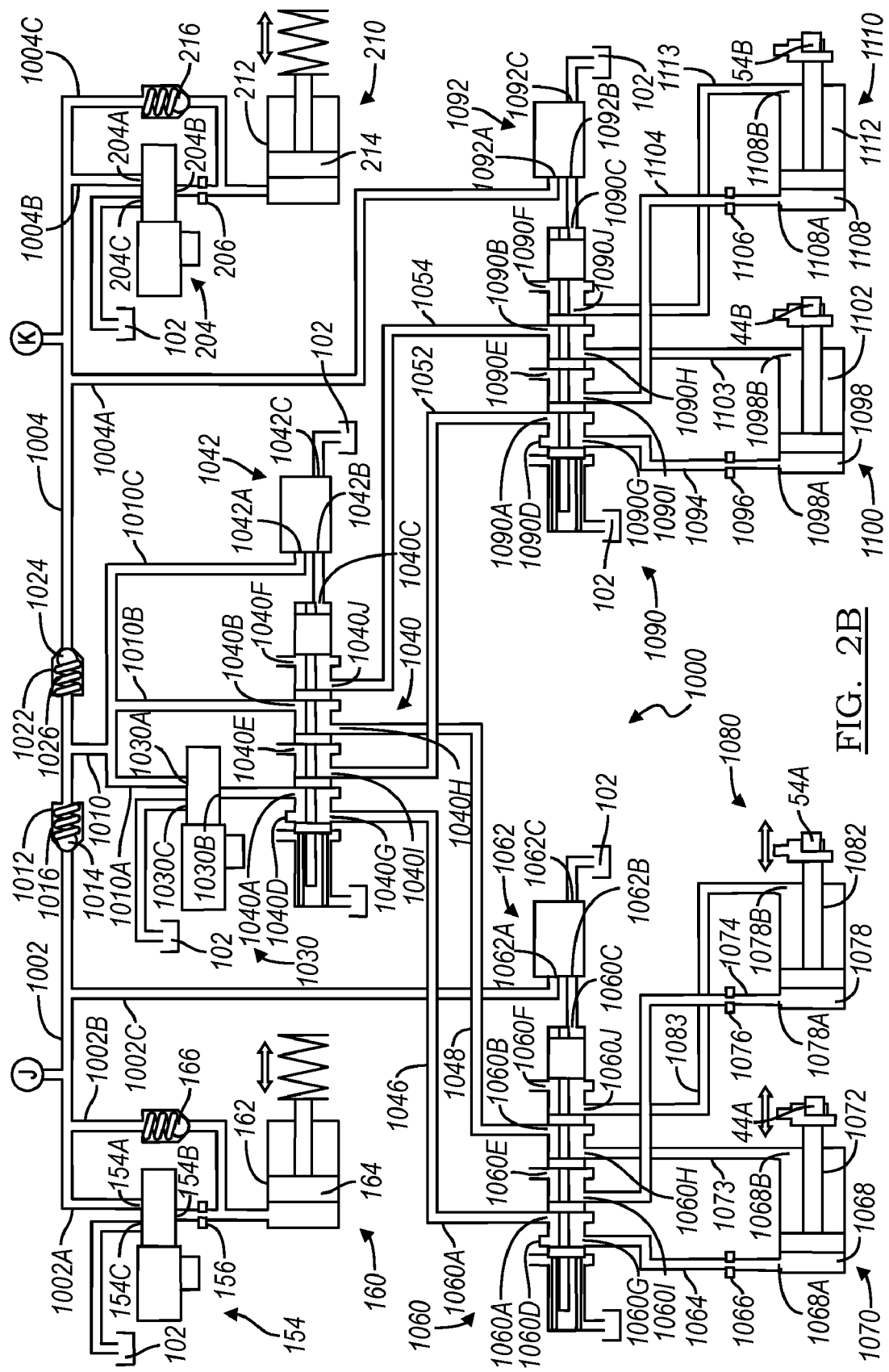

Referring now to FIGS. 1A, 2A and 2B, a first embodiment of a hydraulic control system for the dual clutch automatic transmission 10 described above is illustrated and designated by the reference number 1000. The hydraulic control system 1000 includes a sump 102 to which hydraulic fluid returns and collects from various components and regions of the automatic transmission 10. A suction line 104 which may include a filter 106 communicates with the inlet port 108 of an engine driven or electric pump 110 which may be, for example, a gear pump, a vane pump, a gerotor pump or other positive displacement pump. An outlet port 112 of the pump 110 provides hydraulic fluid under pressure in a supply line 114 to a spring biased blow-off safety valve 116 and to a pressure side filter 118 which is disposed in parallel with a spring biased check valve 120. The safety valve 116 is set at a relatively high predetermined pressure and if the pressure in the supply line 114 exceeds this pressure, the safety valve 116 opens momentarily to relieve and reduce it. If pressure ahead of the filter 118 rises to a predetermined differential pressure, indicating a partial blockage or flow restriction when cold of the filter 118 and the possibility that insufficient hydraulic fluid may be provided in an outlet line 122 to the remainder of the control system 1000, the check valve 120 opens to allow hydraulic fluid to bypass the filter 118.

A second check valve 124, in the outlet line 122, is configured to maintain hydraulic pressure in a main supply line 126 and to prevent backflow through the pump 110. The main supply line 126 supplies pressurized hydraulic fluid to an accumulator 130 having a piston 132 and a biasing compression spring 134. The accumulator 130 may be one of many other designs including a gas filled piston accumulator. The accumulator 130 stores pressurized hydraulic fluid and supplies it to the main supply line 126, to a main or system pressure sensor 136 and to the other components of the control system 1000 thereby eliminating the need for the engine driven or electric pump 110 to run continuously. The main pressure sensor 136 reads the delivered hydraulic system pressure in real time and provides this data to the transmission control module TCM. It should be appreciated that all of the other embodiments of the hydraulic control system according to the present invention preferably include the same hydraulic supply, filtration and control components just described. Accordingly, these components will be only briefly described in connection with the subsequent figures and embodiments, it being understood that the above description may be referenced to provide details of these components.

The first main supply line 126A communicates with an inlet port 140A of a first pressure control solenoid valve 140 and the second main supply line 126B communicates with an inlet port 190A of a second pressure control solenoid valve 190. The outlet port 140B of the first pressure control solenoid valve 140 communicates with a first manifold 1002 and an outlet port 190B of the second pressure control solenoid valve 190 communicates with a second manifold 1004. A first branch 1002A of the first manifold 1002 communicates with an inlet port 154A of a first electric pressure or flow clutch control solenoid valve 154. The first clutch control solenoid valve 154 also includes an outlet port 154B and an exhaust port 154C which communicates with the sump 102.

When the clutch control solenoid valve 154 is activated or energized, pressurized hydraulic fluid is provided through a flow control orifice 156 in a line 158 to a first clutch piston and cylinder assembly 160. It should be understood that the addition or removal of flow control orifices in all the hydraulic lines of the hydraulic control system 1000 as well as the other embodiments is within the purview of the present invention. The locations and sizes of the flow control orifices are based on operational, software and algorithm requirements. Slidably disposed within a cylinder 162 is a single acting piston 164 which translates to the right in FIG. 2B under hydraulic pressure to engage the first input clutch 22A, illustrated in FIG. 1A. When the first clutch control solenoid valve 154 is de-energized, the inlet port 154A is closed and hydraulic fluid from the cylinder 162 passes from the outlet port 154B to the exhaust port 154C and into the sump 102. A second branch 1002B of the first manifold 1002 communicates with the output of a first clutch pressure limit control valve 166. If pressure within the first clutch piston and cylinder assembly 160 exceeds a predetermined pressure determined by the pressure control solenoid 140, the first pressure limit control valve 166 opens to relieve and reduce the pressure.

A second branch 1004B of the second manifold 1004 communicates with an inlet port 204A of a second electric pressure or flow clutch control solenoid valve 204. The second clutch control solenoid valve 204 also includes an outlet port 204B and an exhaust port 204C which communicates with the sump 102.

When the second clutch control solenoid valve 204 is activated or energized, pressurized hydraulic fluid is provided through an orifice 206 in a line 208 to a second clutch piston and cylinder assembly 210. Slidably disposed within a cylinder 212 is a single acting piston 214 which translates under hydraulic pressure to the right in FIG. 2B, to engage the second input clutch 22B, illustrated in FIG. 1A. When the second clutch control solenoid valve 204 is inactive or de-energized, the inlet port 204A is closed off and hydraulic fluid from the cylinder 212 passes from the outlet port 204B to the exhaust port 204C and into the sump 102. A third branch 1004C of the second manifold 1004 communicates with the output of a clutch pressure limit control valve 216. If pressure within the second clutch piston and cylinder assembly 210 exceeds a predetermined pressure supplied by the pressure control solenoid 190, then the pressure limit control valve 216 opens to relieve and reduce the pressure.

A pair of symmetrically oriented, i.e., back-to-back, check valves are disposed between the first and second manifolds 1002 and 1004 and a third manifold 1010. A first check valve 1012 is disposed between the first manifold 1002 and the third manifold 1010 and an oppositely disposed second check valve 1022 is disposed between the second manifold and the third manifold 1010. The first check valve 1012 includes a check ball 1014 and a compression spring 1016 which biases the check ball 1014 toward the first manifold 1002. Thus, fluid flow is inhibited from the third manifold 1010 to the first manifold 1002 but a pressure differential high enough to overcome the force of the compression spring 1016 will cause fluid flow from the first manifold 1002 to the third manifold 1010.

Likewise, the second check valve 1022 includes a check ball 1024 and a compression spring 1026 which biases the check ball 1024 toward the second manifold 1004. Thus, fluid flow is inhibited from the third manifold 1010 to the second manifold 1002 but a pressure differential high enough to overcome the force of the compression spring 1026 will cause fluid flow from the second manifold 1004 to the third manifold 1010. The two check valves 1012 and 1022 may be replaced by one three-way check valve containing a single check ball, if desired.

A first branch 1010A of the third manifold 1010 communicates with an inlet port 1030A of a first electric pressure or flow control solenoid valve 1030. An outlet port 1030B of the first pressure or flow control solenoid valve 1030 communicates with a first inlet port 1040A of a first spool or logic control valve 1040. An exhaust port 1030C communicates with the sump 102. A second branch 1010B of the third manifold 1010 communicates with a second inlet port 1040B. A third branch 1010C of the third manifold 1010 connects to an inlet port 1042A of a first two position (on-off) solenoid valve 1042. An outlet port 1042B of the first two position solenoid valve 1042 communicates with a control port 1040C at the end of the first logic valve 1040.

When the two position solenoid valve 1042 is activated or energized, pressurized hydraulic fluid is supplied to the control port 1040C of the first logic valve 1040, translating the spool to the left as illustrated in FIG. 2B; when the two position solenoid valve 1042 is inactive or de-energized, hydraulic fluid is exhausted from the first logic valve 1040, through the outlet port 1042B and out an exhaust port 1042C to the sump 102, allowing the spool to translate to the right. Three exhaust ports 1040D, 1040E and 1040F alternate with the two inlet ports 1040A and 1040B and, although not indicated for reasons of clarity, communicate with the sump 102.

The first spool or logic control valve 1040 includes a first outlet port 1040G which communicates with a first inlet port 1060A of a second spool or logic valve 1060 through a line 1046 and a third outlet port 1040H which communicates with a second inlet port 1060B of the second spool or logic valve 1060 through a line 1048. A third branch 1002C of the first manifold 1002 connects to an inlet port 1062A of a second two position (on-off) solenoid valve 1062. An outlet port 1062B of the second two position solenoid valve 1062 communicates with a control port 1060C at the end of the second logic valve 1060.

When the second two position solenoid valve 1062 is activated or energized, pressurized hydraulic fluid is supplied to the control port 1060C of the second logic valve 1060, translating the spool to the left as illustrated in FIG. 2B; when the two position solenoid valve 1062 is inactive or de-energized, hydraulic fluid is exhausted from the second logic valve 1060, through the outlet port 1062B and out an exhaust port 1062C to the sump 102, allowing the spool to translate to the right. Three exhaust ports 1060D, 1060E and 1060F alternate with the two inlet ports 1060A and 1060B and, although not indicated for reasons of clarity, communicate with the sump 102. The hydraulic lines connecting the logic valves and shift actuators may be in any order or arrangement as long as system operation and functionality is maintained.

A first outlet port 1060G of the second logic valve 1060 communicates through a line 1064 having a flow restricting orifice 1066 with a first port 1068A of a cylinder 1068 of a first shift actuator piston and cylinder assembly 1070. The first shift actuator piston and cylinder assembly 1070 includes a piston 1072 that is coupled to and drives, for example, the first shift rail and fork assembly 44A and the first synchronizer clutch assembly 42A. The cylinder 1068 also includes a second port 1068B which communicates through a line 1073 with a third outlet port 1060H of the second logic valve 1060. A second outlet port 1060I of the second logic valve 1060 communicates through a line 1074 having a flow restricting orifice 1076 with a first port 1078A of a cylinder 1078 of a second shift actuator piston and cylinder assembly 1080. The second shift actuator piston and cylinder assembly 1080 includes a piston 1082 that is coupled to and drives, for example, the second shift rail and fork assembly 54A and the second synchronizer clutch assembly 52A. The cylinder 1078 also includes a second port 1078B which communicates through a line 1083 with a fourth outlet port 1060J of the second logic valve 1060.

Returning to the first spool or logic control valve 1040, it includes a second outlet port 1040I which communicates with a first inlet port 1090A of a third spool or logic valve 1090 through a line 1052 and a fourth outlet port 1040J which communicates with a second inlet port 1090B of the third spool or logic valve 1090 through a line 1054. A first branch 1004A of the second manifold 1004 connects to an inlet port 1092A of a third two position (on-off) solenoid valve 1092. An outlet port 1092B of the second two position solenoid valve 1092 communicates with a control port 1090C at the end of the third logic valve 1090.

When the third two position solenoid valve 1092 is activated or energized, pressurized hydraulic fluid is supplied to the control port 1090C of the third logic valve 1090, translating the spool to the left as illustrated in FIG. 2B. When the third two position (on-off) solenoid valve 1092 is de-energized, hydraulic fluid is exhausted from the third logic valve 1090, through the outlet port 1092B of the third two position (on-off) solenoid valve 1092 and out an exhaust port 1092C to the sump 102, allowing the spool to translate to the right. Three exhaust ports 1090D, 1090E and 1090F alternate with the two inlet ports 1090A and 1090B and, although not indicated for reasons of clarity, communicate with the sump 102.

A first outlet port 1090G of the third logic valve 1090 communicates through a line 1094 having a flow restrictor 1096 with a first port 1098A of a cylinder 1098 of a third shift actuator piston and cylinder assembly 1100. The third shift actuator piston and cylinder assembly 1100 includes a piston 1102 that is coupled to and drives, for example, the third shift rail and fork assembly 44B and the third synchronizer clutch assembly 42B. The cylinder 1098 also includes a second port 1098B which communicates through a line 1103 with a third outlet port 1090H of the third logic valve 1090. A second outlet port 1090I of the third logic valve 1090 communicates through a line 1104 having a flow restricting orifice 1106 with a first port 1108A of a cylinder 1108 of a fourth shift actuator piston and cylinder assembly 1110. The fourth shift actuator piston and cylinder assembly 1110 includes a piston 1112 that is coupled to and drives, for example, the fourth shift rail and fork assembly 54B and the fourth synchronizer clutch assembly 52B. The cylinder 1108 also includes a second port 1108B which communicates through a line 1113 with a fourth outlet port 1090J of the third logic valve 1090.

Referring now to FIGS. 1B, 3A, 3B and 3C, a second embodiment of a hydraulic control system according to the present invention is illustrated and generally designated by the reference number 1150. The second embodiment 1150, while sharing many components with the first embodiment 1000, is intended for use with the seven speed transmission 60 illustrated in FIG. 1B having five shift rails and shift actuators. The second embodiment 1150 of the hydraulic control system, as stated, includes, in common with the other embodiments, the pump 110, the filters 106 and 118, the accumulator 130 and the other components of the hydraulic fluid supply and thus they will not be further described. Additionally, the first main supply line 126A communicates with the inlet port 140A of the first pressure control solenoid valve 140 and the second main supply line 126B communicates with the inlet port 190A of the second pressure control solenoid valve 190. The outlet port 140B of the first pressure control solenoid valve 140 communicates with a first manifold 1002 and the outlet port 190B of the second pressure control solenoid valve 190 communicates with a second manifold 1004.

Similarly, the second embodiment 1150 includes the components associated with activation of the first clutch 64A, such as the first electric pressure or flow clutch control solenoid valve 154 which receives hydraulic fluid from a first branch 1002A of the first manifold 1002, the orifice 156, the first clutch piston and cylinder assembly 160 and the first clutch pressure limit control valve or ball 166 which communicates with a second branch 1002B of the first manifold 1002 as well as the components associated with activation of the second clutch 64B, such as the second electric pressure or flow clutch control solenoid valve 204 which receives hydraulic fluid from a second branch 1004B of the second manifold 1004, the orifice 206, the second clutch piston and cylinder assembly 210 and the second clutch pressure limit control valve or ball 216 which communicates with a third branch 1004C of the second manifold 1004.

The second embodiment 1150 also includes the first check valve 1012 disposed between the first manifold 1002 and the third manifold 1010 and the symmetrically arranged second check valve 1022 disposed between the second manifold 1004 and the third manifold 1010. The first check valve 1012 includes the check ball 1014 and the compression spring 1016, the second check valve 1022 includes the check ball 1024 and the compression spring 1026 and both the first check valve 1012 and the second check valve 1022 function in the same manner as described above with reference to the first embodiment illustrated in FIGS. 2A and 2B. Accordingly, they may also be replaced with a single three-way check valve.

Furthermore, the second embodiment 1150 includes the first branch 1010A of the third manifold 1010 which communicates with the inlet port 1030A of the first pressure or flow control solenoid valve 1030 having the outlet port 1030B which communicates with a first inlet port 1040A of the first spool or logic control valve 1040 and the second branch 1010B which communicates with the second inlet port 1040B. The third branch 1010C communicates with a first two position (on-off) solenoid valve 1042 which includes the outlet port 1042B and the exhaust port 1042C which selectively provide and exhaust pressurized hydraulic fluid to and from the control port 1040C to translate the spool of the first logic control valve 1040. Three exhaust ports 1040D, 1040E and 1040F alternate with the two inlet ports 1040A and 1040B and, although not indicated for reasons of clarity, communicate with the sump 102. The first spool or logic control valve 1040 includes four outlet ports 1040G, 1040H, 1040I and 1040J. The first spool or logic control valve 1040 and the first two position solenoid valve 1042 function as described above in connection with the first embodiment 1000.

Finally, the second embodiment 1150 also shares the lines 1046 and 1048, the second spool or logic valve 1060, the second two position solenoid valve 1062, the lines 1064 and 1073, the orifice 1066, the first shift actuator piston and cylinder assembly 1070 which preferably includes a dual diameter piston 1072A, the lines 1074 and 1083, the orifice 1076 and the second shift actuator piston and cylinder assembly 1080. Once again, these components function as described above to bi-directionally translate, for example, two shift rails and the associated components to select three forward gears or gear ratios.

Figure 3A:
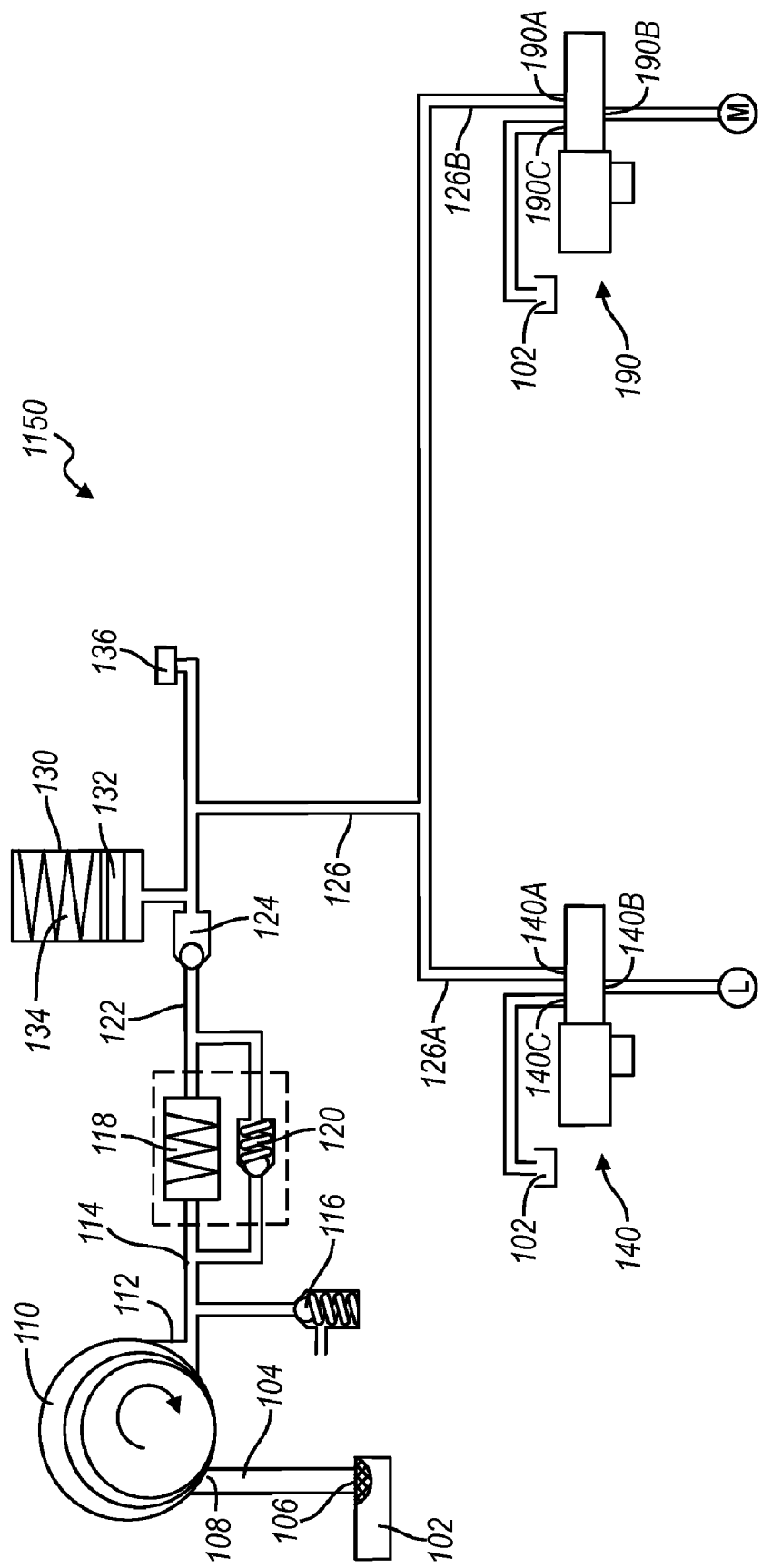
FIGS. 3A, 3B and 3C are schematic flow diagrams of an second embodiment of a hydraulic control system according to the present invention for a dual clutch automatic transmission.
Figure 3B:
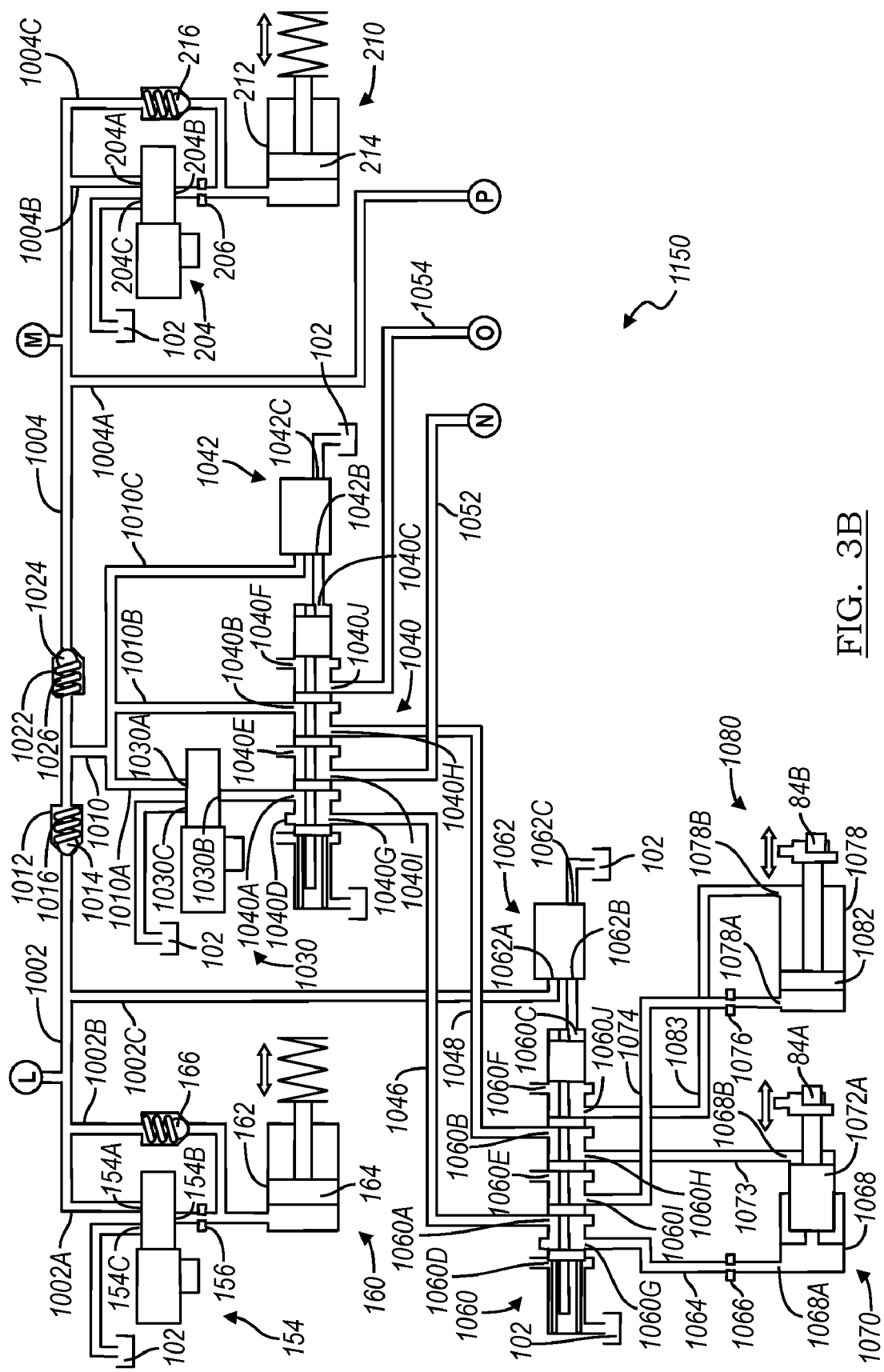
Figure 3C:
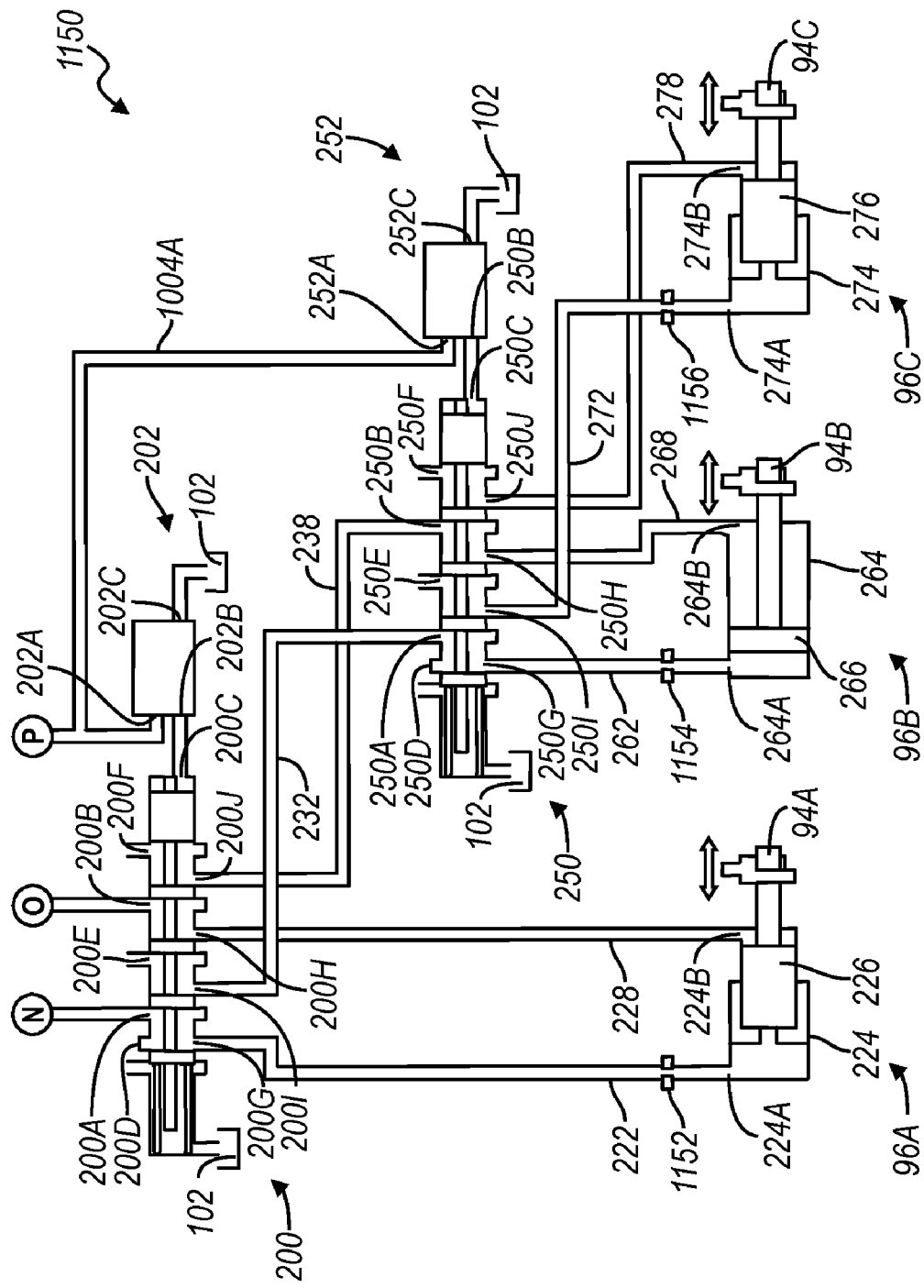

The second embodiment 1150 differs from the first embodiment 1000 of the hydraulic control system in the valves and hydraulic circuitry associated with the other gears or gear ratios. That is, the second embodiment 1150 includes a hydraulic line 1052 from the second outlet port 1040I of the first logic valve 1040 which communicates with a first inlet port 200A of a third logic valve 200. A line 1054 from the fourth outlet port 1040I of the first logic valve 1040 communicates with the second inlet port of 200B of the third logic valve 200. A first branch 1004A of the second manifold 1004 communicates with an inlet port 202A of a third two position solenoid valve 202. The outlet port 202B of the third two position solenoid valve 202 communicates with a control port 200C of the third logic valve 200. When the third two position solenoid valve 202 is energized, pressurized hydraulic fluid is supplied to the control port 200C, translating the spool of the third logic valve 200 to the left as illustrated in FIG. 3C and vice versa. Three exhaust ports 200D, 200E and 200F alternate with the two inlet ports 200A and 200B and, although not indicated for reasons of clarity, communicate with the sump 102

The third spool or logic valve 200 also includes a first outlet port 200G which communicates through a line 222 and a flow restricting orifice 1152 to a port 224A at one end of the third shift actuator assembly 96A which includes a cylinder or housing 224 and a preferably dual area piston 226 which is connected to the third shift rail and fork assembly 94A. For example, the third shift actuator assembly 96A and the third shift rail and fork assembly 94A are associated with fifth and seventh gears. A port 224B at the other end of the cylinder 224 of the third shift actuator assembly 96A communicates through a line 228 to a third outlet port 200H.

A line 232 communicating with the second outlet port 200I of the third logic valve 200 is connected to a first inlet port 250A of a fourth spool or logic valve 250. A line 238 communicating with the fourth outlet port 200J of the third logic valve 200 is connected to the second inlet port 250B of the fourth spool or logic valve 250. The fourth spool or logic valve 250 includes a control port 250C that communicates with an outlet port 252B of a fourth two position (on-off) solenoid valve 252. The fourth two position solenoid valve 252 includes an inlet port 252A which is in fluid communication with the first branch 1004A of the manifold 1004 and an exhaust port 252C which communicates with the sump 102.

A first outlet port 250G of the fourth logic valve 250 communicates through a line 262 and a flow restricting orifice 1154 to a port 264A at one end of the fourth shift actuator assembly 96B which includes a cylinder or housing 264 and a piston 266 which is connected to the fourth shift rail and fork assembly 94B. In the transmission 60 illustrated in FIG. 1B, for example, the fourth shift actuator assembly 96B and the fourth shift rail and fork assembly 94B are associated with and engage only third gear. A port 264B at the other end of the cylinder 264 of the fourth shift actuator assembly 96B communicates through a line 268 to a third outlet port 250H.

When the fourth two position solenoid valve 252 is not energized, hydraulic fluid flows through the first and third outlet ports 250G and 250H as described, selecting or de-selecting, for example, only third gear. When the fourth two position solenoid valve 252 is energized, the spool of the fourth logic valve 250 translates to the left, as illustrated in FIG. 3C, and pressurized hydraulic fluid flows through the second outlet port 250I in a line 272 and through a flow restricting orifice 1156 to a port 274A at one end of the fifth shift actuator assembly 96C which includes a cylinder or housing 274 and a preferably dual area piston 276 which is connected to the fifth shift rail and fork assembly 94C. A port 274B at the other end of the cylinder or housing 274 communicates with the fourth outlet port 250J through the line 278. The fifth shift actuator assembly 96C engages, for example, first and reverse gears.

Referring now to FIGS. 1B, 4A, 4B, 4C and 5, a third embodiment of a hydraulic control system according to the present invention is illustrated and generally designated by the reference number 1200. The third embodiment 1200 shares most components with the second embodiment 1150 and is also is intended for use with a seven speed transmission, such as the transmission 60 having five shift rails: three which each engage two gears or gear ratios and two which engage only a single gear or gear ratio. The third embodiment 1200 of the hydraulic control system, as stated, includes, in common with the other embodiments, the pump 110, the filters 106 and 118, the accumulator 130 and the other components of the hydraulic fluid supply and thus they will not be further described.

The differences between the second embodiment 1150 and the third embodiment 1200 involve the devices between the first and second main supply lines 126A and 126B and the first and second manifolds 1002 and 1004, respectively. In both instances, the electric pressure or flow control solenoid valve has been replaced with a feed limit valve assembly illustrated in FIG. 5. Since the first feed limit valve assembly 610 and the second feed limit valve assembly 660 and their operation are identical, only the first feed limit valve assembly 610 will be described Referring now to FIG. 5, the first feed limit valve assembly 610 receives pressurized hydraulic fluid in the first main supply line 126A. The line 126A bifurcates and one branch communicates with an inlet port 612 of a two position (on-off) solenoid valve 614. The solenoid valve 614 includes an outlet port 616 which is in fluid communication with the inlet port 612 when the solenoid valve 614 is energized. The solenoid valve 614 also includes an exhaust port 618 which connects to the sump 102 through a line 622. When the solenoid valve 614 is de-energized, the outlet port 616 is in fluid communication with the exhaust port 618.

The outlet port 616 of the solenoid valve 614 is connected by a line 624 to a control port 626 of a multiple port spool or control valve 630. The control valve 630 includes a spool 632 having two spaced-apart lands 634A and 634B. The following ports provide oil around and to the control valve 630: the control port 626, an inlet port 636 which is connected to the first main supply line 126A, a feedback port 638, an outlet port 640 and an exhaust port 642 which communicates with the sump 102. A compression spring 645 which biases the spool 632 toward the control port 626 is disposed within the control valve 630 proximate the exhaust port 642. The outlet port 640 is connected to and communicates with the first manifold 142 and, through a flow restricting orifice 644, and a check valve 646 having, for example, a check ball 648 and a compression spring 652, with the feedback port 638. The compression spring 652 biases the check ball 648 toward the orifice 644 such that fluid flow from the feedback port 638 to the first manifold 142 is prohibited but fluid flow from the first manifold 142 to the feedback port 638 is possible if the pressure differential across the check ball 648 is high enough to overcome the bias of the compression spring 652. Depending upon operational conditions and considerations, the compression spring 652 may be omitted without operational degradation.

Figure 5:
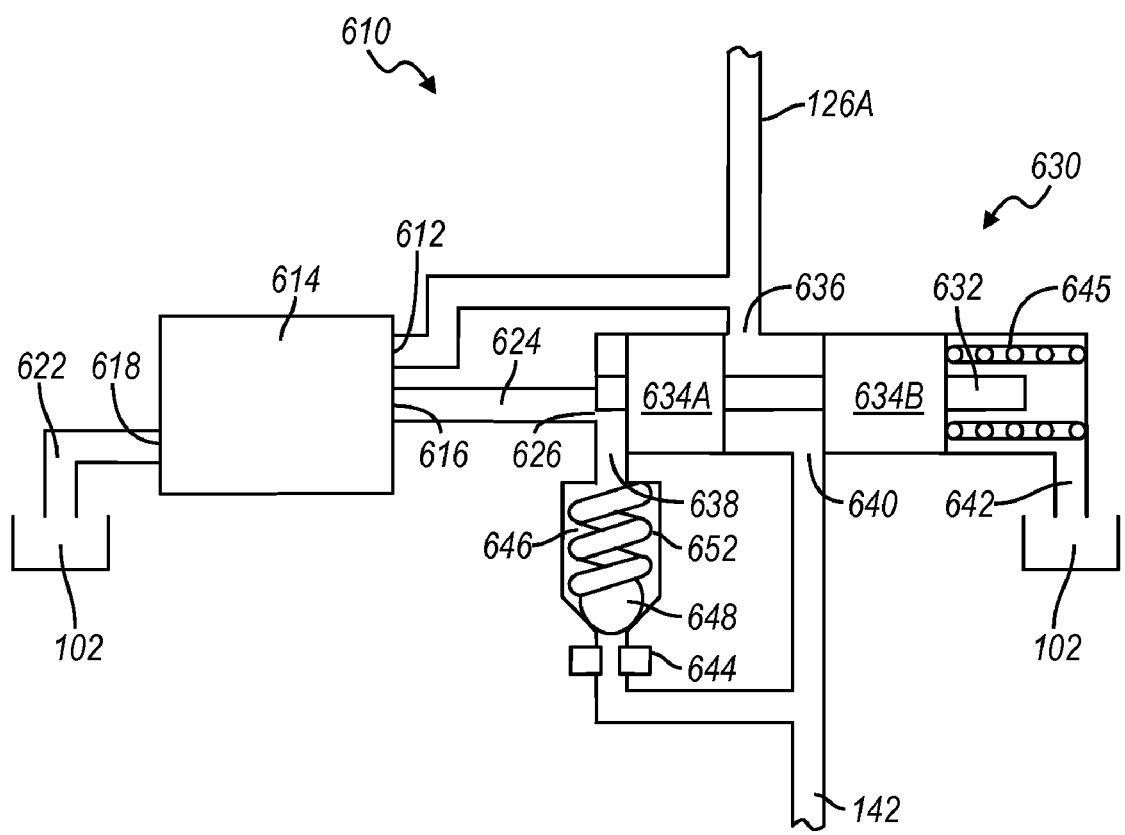
FIG. 5 is an enlarged, diagrammatic view of a feed limit valve with flow cut-off for a hydraulic control system according to the present invention.

In operation, the first feed limit valve assembly 610 provides improved hydraulic flow and pressure control to the other components of the hydraulic control system 1200. In its relaxed state, as illustrated in FIG. 5, flow from the main supply line 126A passes through the control valve 630 between the lands 634A and 634B and out the outlet port 640 to the first manifold 142. As hydraulic pressure in the system builds as, for example, actuators move and fill, the pressure will increase on the check ball 648, unseating it and hydraulic fluid will flow to the feedback port 638. This action translates the valve spool 632 to the right, closing off flow to the inlet port 636 or the outlet port 640 (depending on valve design) and the first manifold 126 or 142. Thus, the pressure delivered to the first manifold 142 can be controlled. Additionally, if the side of the transmission 60 associated with the control valve 610 is to be inoperative, for example, while the other side of the transmission 60 is operating, the solenoid valve 614 is energized to provide hydraulic fluid from the first main supply line 126A to the control port 626 to translate the valve spool 632 to the right to close off fluid flow between the inlet port 636 and the outlet port 640. In this operating mode, the check valve 646 prevents the fluid pressure provided to the control port 626 and the feedback port 638 from being communicated to the first manifold 142 and the other components of the system.

Similarly, the third embodiment 1200 includes the components associated with activation of the first clutch 64A, such as the first electric pressure or flow clutch control solenoid valve 154 which receives hydraulic fluid from the first branch 1002A of the first manifold 1002, the orifice 156, the first clutch piston and cylinder assembly 160 and the first clutch pressure limit control valve 166 which communicates with the second branch 1002B of the first manifold 1002 as well as the components associated with activation of the second clutch 64B, such as the second electric pressure or flow clutch control solenoid valve 204 which receives hydraulic fluid from the second branch 1004B of the second manifold 1004, the orifice 206, the second clutch piston and cylinder assembly 210 and the second clutch pressure limit control valve 216 which communicates with the third branch 1004C of the second manifold 1004.

The third embodiment 1200 also includes the first check valve 1012 disposed between the first manifold 1002 and the third manifold 1010 and the symmetrically arranged second check valve 1022 disposed between the second manifold 1004 and the third manifold 1010. The first check valve 1012 includes the check ball 1014 and the compression spring 1016, the second check valve 1022 includes the check ball 1024 and the compression spring 1026 and both the first check valve 1012 and the second check valve 1022 function in the same manner as described above with reference to the second embodiment 1150 illustrated in FIGS. 3A, 3B and 3C.

Furthermore, the third embodiment 1200 includes the first pressure or flow control solenoid valve 1030 having the outlet port 1030B which communicates with a first inlet port 1040A of the first spool or logic control valve 1040 and a first two position (on-off) solenoid valve 1042 having the outlet port 1042B which selectively provides pressurized hydraulic fluid to the control port 1040C to translate the spool of the first logic control valve 1040. The first spool or logic control valve 1040 includes the four outlet ports 1040G, 1040H, 1040I and 1040J. The first spool or logic control valve 1040 and the first two position solenoid valve 1042 function as described above in connection with the second embodiment 1150.

The third embodiment 1200 also includes the lines 1046 and 1048, the second spool or logic valve 1060, the second two position (on-off) solenoid valve 1062, the lines 1064 and 1073, the orifice 1066, the first, preferably dual area shift actuator piston and cylinder assembly 1070, the lines 1074 and 1083, the orifice 1076 and the second shift actuator piston and cylinder assembly 1080. Once again these components function as described above to bi-directionally translate, for example, two shift rails and the associated components to select three forward gears or gear ratios.

The third embodiment 1200 also includes the line 1052 which connects to the first inlet port 200A of the third logic valve 200. The line 1054 connects to the second inlet port of 200B of the third logic valve 200. The first branch 1004A of the second manifold 1004 communicates with the inlet port 202A of the third two position solenoid valve 202. The outlet port 202B of the third two position solenoid valve 202 communicates with the control port 200C of the third logic valve 200. When the third two position solenoid valve 202 is energized, pressurized hydraulic fluid is supplied to the control port 200C, translating the spool of the third logic valve 200 to the left as illustrated in FIG. 4C and vice versa. Three exhaust ports 200D, 200E and 200F alternate with the two inlet ports 200A and 200B and, although not indicated for reasons of clarity, communicate with the sump 102

The third spool or logic valve 200 also includes a first outlet port 200G which communicates through the line 222 and a flow restricting orifice 1152 to a port 224A of the third, preferably dual area shift actuator assembly 96A which includes the third cylinder or housing 224 and the third dual area piston 226 which is connected to the third shift rail and fork assembly 94A. In the transmission 60 illustrated in FIG. 1B, for example, the third shift actuator assembly 96A and the third shift rail and fork assembly 94A are associated with fifth and seventh gears. The port 224B at the other end of the cylinder 224 of the third shift actuator assembly 96A communicates through the line 228 to the second outlet port 200H.

The line 232 communicating with the second outlet port 200I of the third logic valve 200 is connected to the first inlet port 250A of the fourth spool or logic valve 250. The line 238 communicating with the fourth outlet port 200J of the third logic valve 200 is connected to the second inlet port 250B of the fourth spool or logic valve 250. The fourth spool or logic valve 250 includes the control port 250C that communicates with the outlet port 252B of the fourth two position solenoid valve 252. The fourth two position solenoid valve 252 includes the inlet port 252A which is in fluid communication with the first branch 1004A of the second manifold 1004 and the exhaust port 252C which communicates with the sump 102.

The first outlet port 250G of the fourth logic valve 250 communicates through the line 262 and the flow restricting orifice 1154 to the port 264A at one end of the fourth shift actuator assembly 96B which includes the fourth cylinder or housing 264 and the fourth piston 266 which is connected to the fourth shift rail and fork assembly 94B. In this embodiment, the fourth shift actuator assembly 96B and the fourth shift rail and fork assembly 94B are associated only with engagement of third gear. The port 264B at the other end of the cylinder 264 communicates through the line 268 to the third outlet port 250H.

When the fourth two position solenoid valve 252 is not energized, hydraulic fluid flows through the first and third outlet ports 250G and 250H as described, selecting third gear. When the fourth two position solenoid valve 252 is energized, the spool of the fourth logic valve 250 translates to the left, as illustrated in FIG. 4C, and pressurized hydraulic fluid flows through the second outlet port 250I in the line 272 and through the flow restricting orifice 1156 to the port 274A at one end of the fifth shift actuator assembly 96C which includes the fifth cylinder or housing 274 and the fifth dual area piston 276 which is connected to the fifth shift rail and fork assembly 94C. The port 274B at the other end of the fifth cylinder or housing 274 communicates with the fourth outlet port 250J through the line 278. The fifth shift actuator assembly 96C, in the transmission 60 illustrated in FIG. 1B, engages either first or reverse gear.

Referring now to FIGS. 1B, 6A, 6B and 6C, a fourth embodiment of a hydraulic control system according to the present invention is illustrated and generally designated by the reference number 1300. The fourth embodiment 1300 shares most components with the third embodiment 1200 and is also intended for use with a seven speed transmission, such as the transmission 60 illustrated in FIG. 1B, having five shift rails: three which each engage two gears or gear ratios and two which engage only a single gear or gear ratio. The fourth embodiment 1300 of the hydraulic control system includes, in common with the other embodiments, the pump 110, the filters 106 and 118, the accumulator 130 and the other components of the hydraulic fluid supply and thus they will not be further described.

Figure 4A:
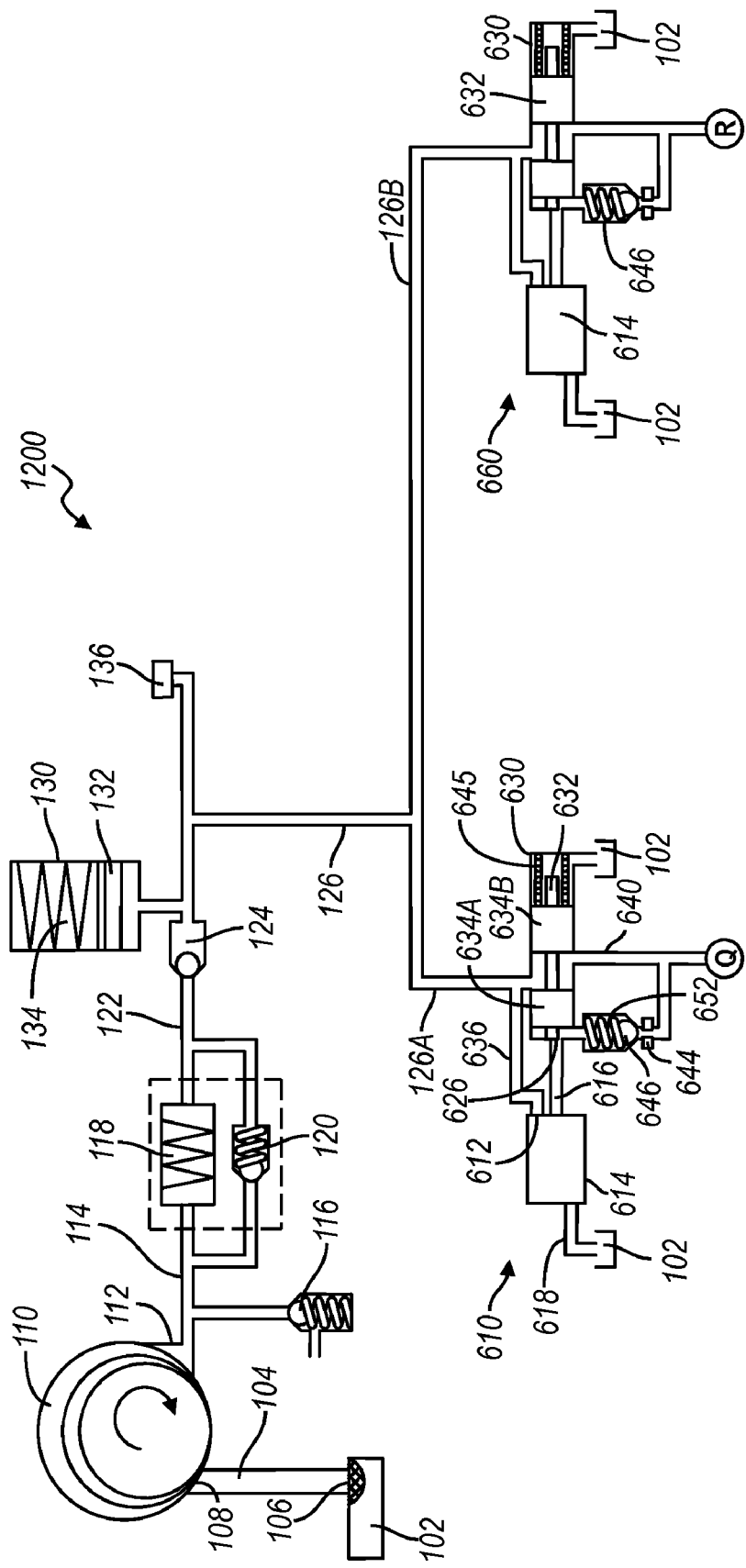
FIGS. 4A, 4B and 4C are schematic flow diagrams of a third embodiment of a hydraulic control system according to the present invention for a dual clutch automatic transmission.
Figure 4B:
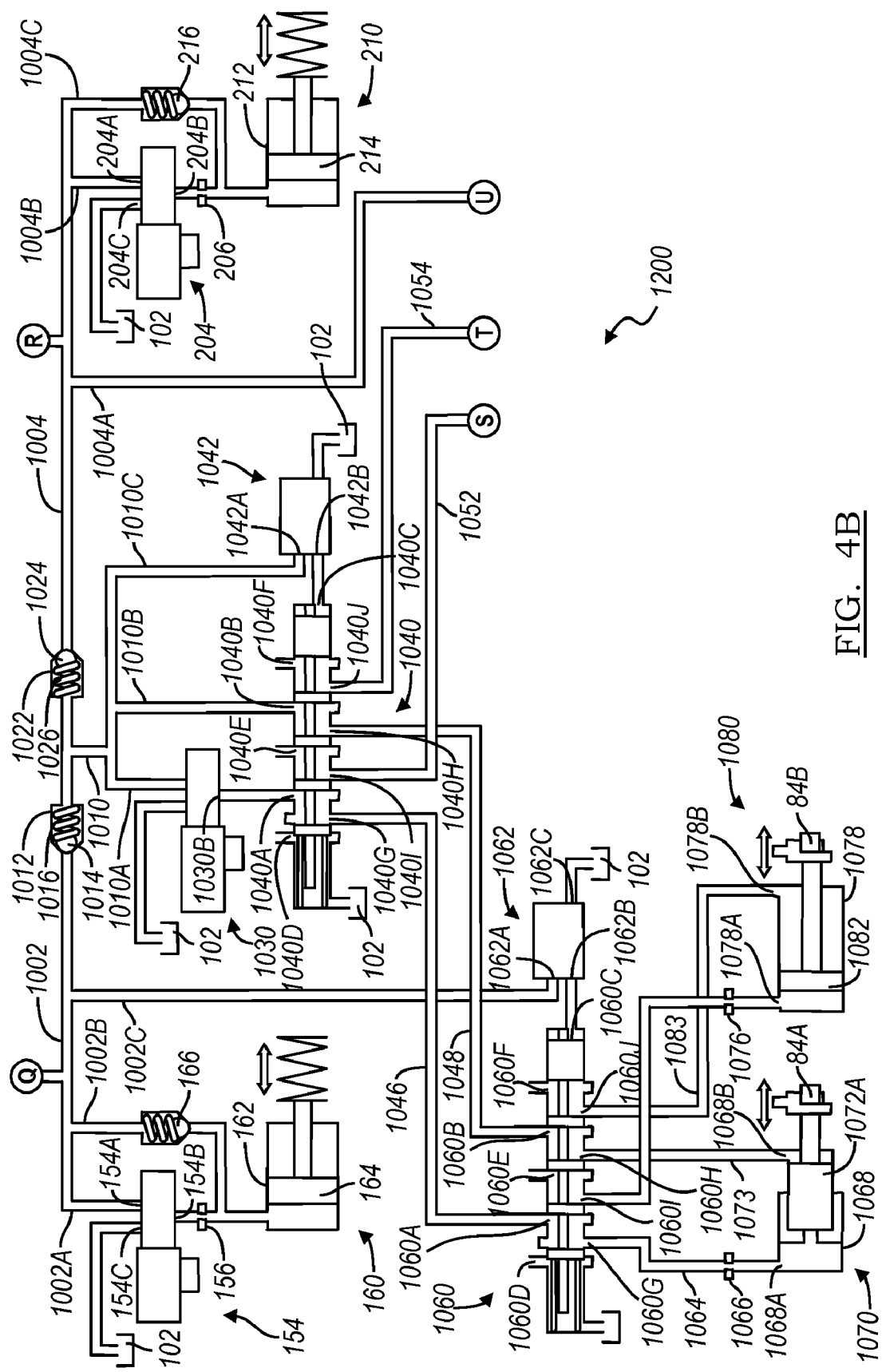
Figure 4C:
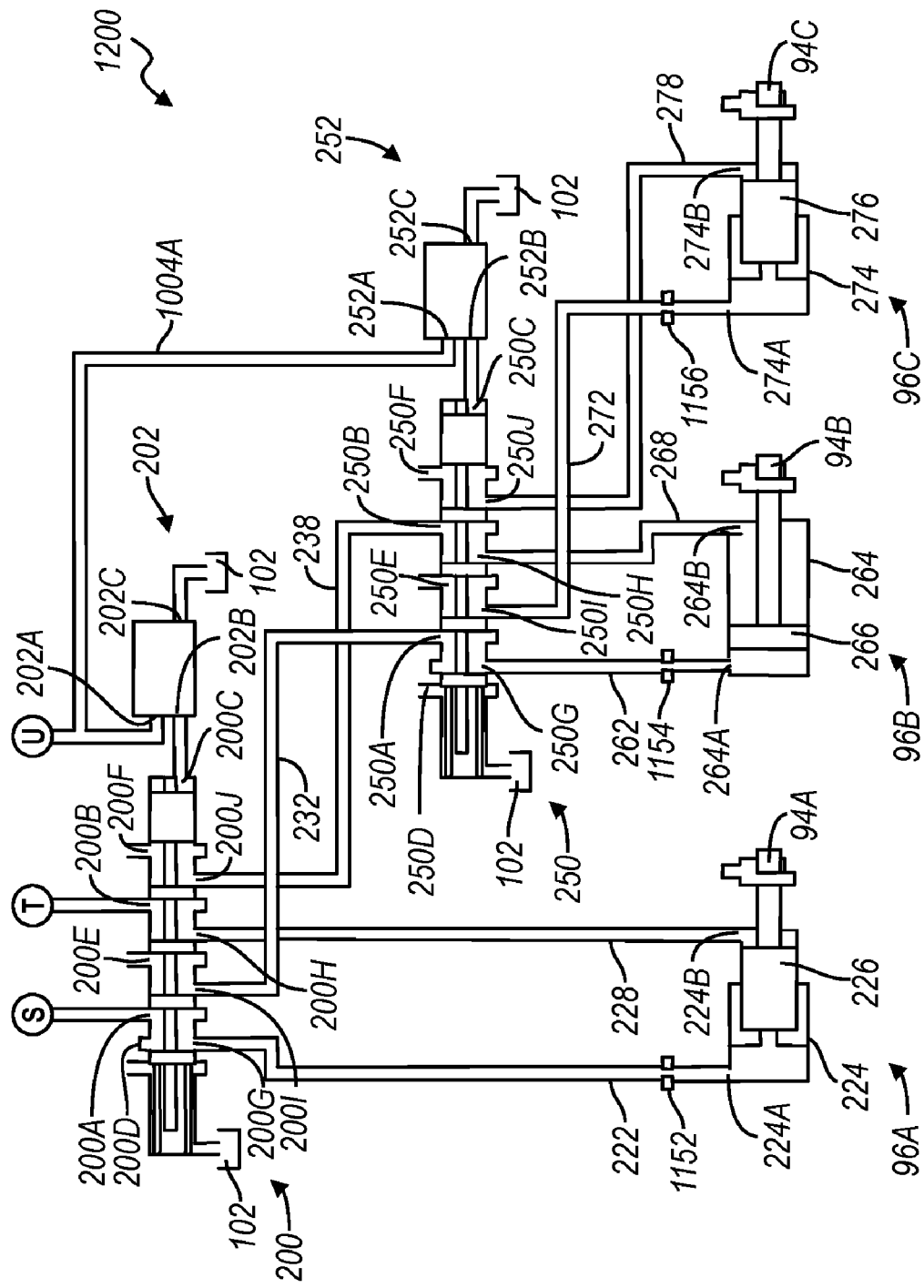
Figure 6A:
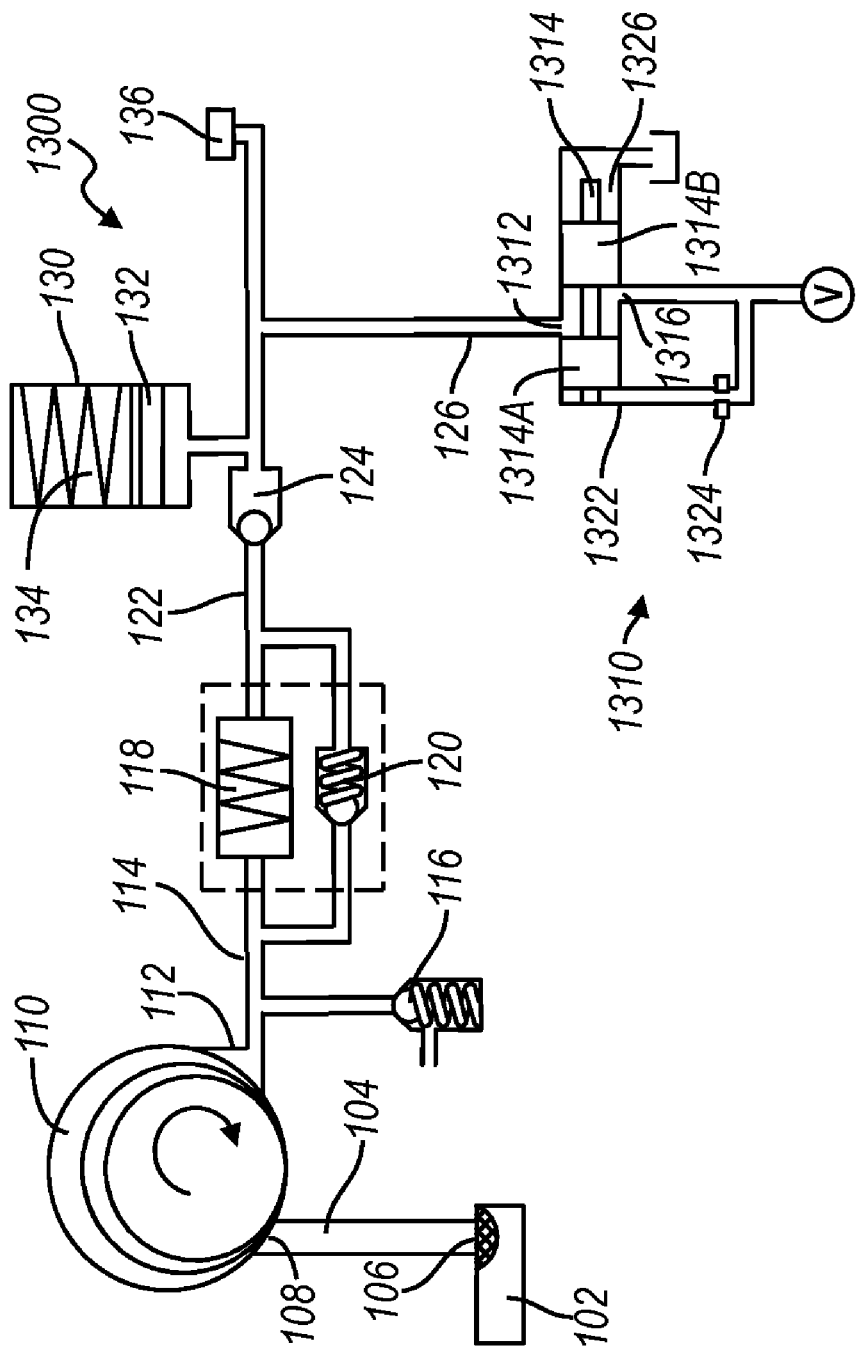
FIGS. 6A, 6B and 6C are schematic flow diagrams of a fourth embodiment of a hydraulic control system according to the present invention for a dual clutch automatic transmission.
Figure 6B:
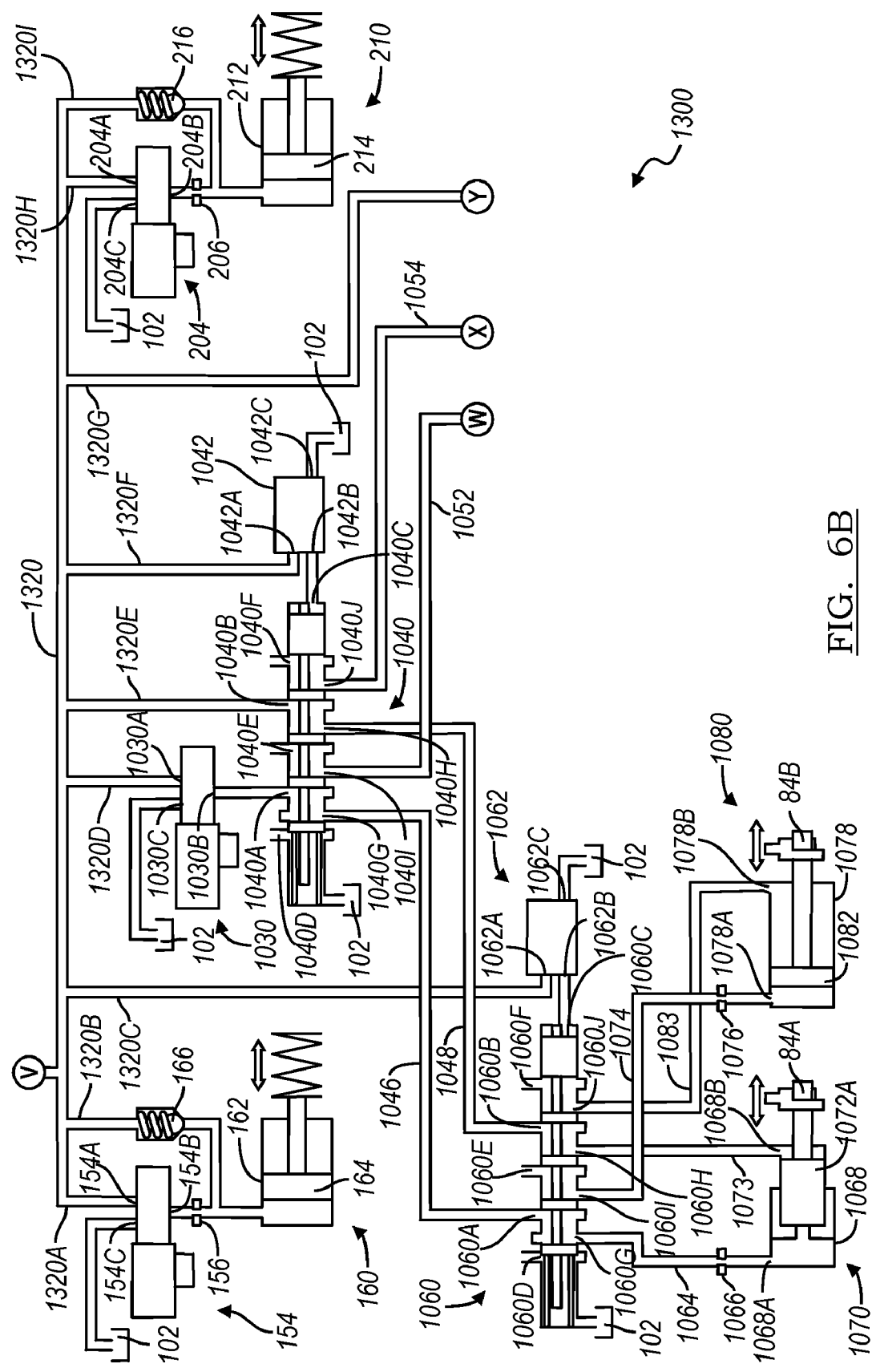
Figure 6C:
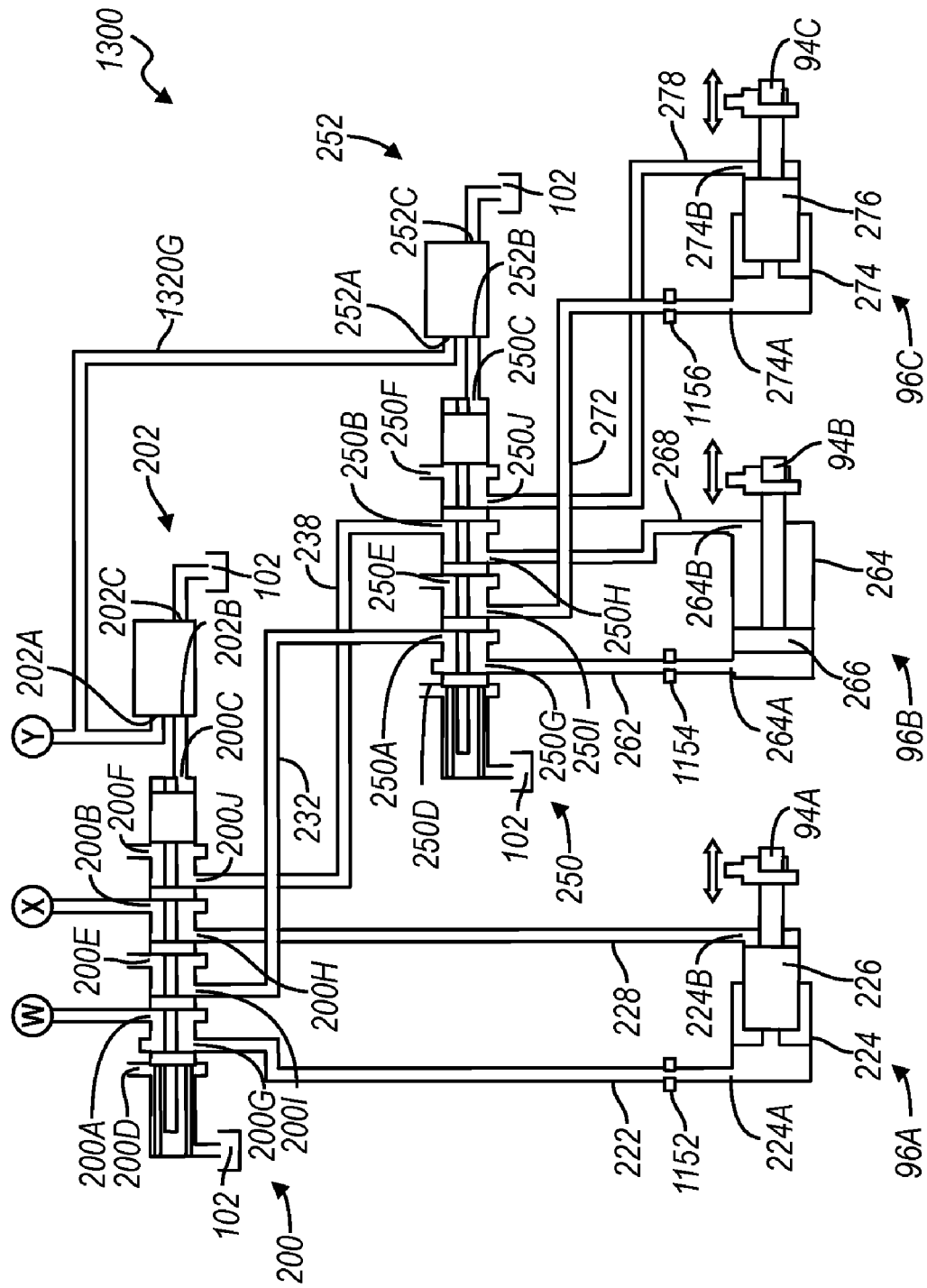

The differences between the third embodiment 1200 illustrated in FIGS. 4A, 4C and 4D and the fourth embodiment 1300 of FIGS. 6A, 6B and 6C involve the replacement or substitution of the first feed limit valve assembly 610 and the second feed limit valve assembly 660 with a single passive pressure regulator (feed limit valve) assembly 1310. The passive pressure regulator assembly 1310 includes an inlet port 1312 which is supplied with pressurized hydraulic fluid in the main supply line 126. The pressure regulator assembly 1310 includes a spool 1314 having a pair of spaced-apart pistons or lands 1314A and 1314B. The pressure regulator assembly 1310 also includes an outlet port 1316 which is in fluid communication with a manifold 1320. The outlet port 1316 is also in fluid communication with a control port 1322 through a flow restricting orifice 1324. At the opposite end of the pressure regulator 1310 from the control port 1322 and disposed in biasing relationship with the spool 1314 is a compression spring 1326. The compression spring 1326 drives the spool 1314 to the left as illustrated in FIG. 6A, which allows communication and fluid flow between the inlet port 1312 and the outlet port 1316. As hydraulic pressure builds in the outlet port 1316, the manifold 1320 and the control port 1322, the spool 1314 will be driven to the right in FIG. 14A, which closes off fluid flow between the inlet port 1312 and the outlet port 1316. The manifold 1320 includes a plurality of branches as described below.

The fourth embodiment 1300 includes the components associated with activation of the first clutch 64A, such as the first electric pressure or flow clutch control solenoid valve 154 which receives hydraulic fluid from the first branch 1320A of the manifold 1320, the orifice 156, the first clutch piston and cylinder assembly 160 and the first clutch pressure limit control valve 166 which communicates with the second branch 1320B of the manifold 1320 as well as the components associated with activation of the second clutch 64B, such as the second pressure or flow clutch control solenoid valve 204 which receives hydraulic fluid from an eighth branch 1320H of the manifold 1320, the orifice 206, the second clutch piston and cylinder assembly 210 and the second clutch pressure limit control valve 216 which communicates with the ninth branch 1320I of the second manifold 1320.

The manifold 1320 also includes a third branch 1320C which communicates with the inlet port 1062A of the second two position (on-off) solenoid valve 1062, a fourth branch 1320D which communicates with the inlet port 1030A of the first pressure or flow control solenoid valve 1030, a fifth branch 1320E which communicates with the second inlet port 1040B of the first spool or logic control valve 1040, a sixth branch 1320F which communicates with the inlet port 1042A of the first two position (on-off) solenoid valve 1042 and a seventh branch 1320G which communicates with both the inlet port 202A of the third two position (on-off) solenoid valve 202 and the inlet port 252A of the fourth two position (on-off) solenoid valve 252.

Additionally, the fourth embodiment 1300 includes the first pressure or flow control solenoid valve 1030 having the outlet port 1030B which communicates with the first inlet port 1040A of the first spool or logic control valve 1040 and the first two position (on-off) solenoid valve 1042 having the outlet port 1042B which selectively provides pressurized hydraulic fluid to the control port 1040C to translate the spool of the first logic control valve 1040. The first spool or logic control valve 1040 includes the four outlet ports 1040G, 1040H, 1040I and 1040J. The first spool or logic control valve 1040 and the first two position (on-off) solenoid valve 1042 function as described above.

The fourth embodiment 1300 also includes the lines 1046 and 1048, the second spool or logic valve 1060, the second two position solenoid valve 1062, the hydraulic lines 1064, 1073, the orifice 1066, the first shift actuator piston and cylinder assembly 1070, the dual area piston 1072A, the lines 1074 and 1083, the orifice 1076 and the second shift actuator piston and cylinder assembly 1080. Once again these components function as described above to bi-directionally translate, for example, two shift rails and the associated components to select three forward gears or gear ratios.

The fourth embodiment 1300 also includes the line 1052 which connects to the first inlet port 200A of the third logic valve 200 and the line 1054 which connects to the second inlet port of 200B. The outlet port 202B of the third two position (on-off) solenoid valve 202 communicates with the control port 200C of the third logic valve 200. When the third two position (on-off) solenoid valve 202 is energized, pressurized hydraulic fluid is supplied to the control port 200C, translating the spool of the third logic valve 200 to the left as illustrated in FIG. 6C and vice versa. Three exhaust ports 200D, 200E and 200F alternate with the two inlet ports 200A and 200B and, although not indicated for reasons of clarity, communicate with the sump 102

The third spool or logic valve 200 also includes a first outlet port 200G which communicates through the line 222 and a flow restricting orifice 1152 to the port 224A of the third shift actuator assembly 96A which includes the cylinder or housing 224 and the dual area piston 226. The third shift actuator assembly 96A, for example, engages either fifth or seventh gear. The port 224B at the other end of the cylinder 224 of the third shift actuator assembly 96A communicates through the line 228 to the third outlet port 200H.

The line 232 communicating with the second outlet port 200I of the third logic valve 200 is connected to the first inlet port 250A of the fourth spool or logic valve 250. The line 238 communicating with the fourth outlet port 200J of the third logic valve 200 is connected to the second inlet port 250B of the fourth spool or logic valve 250. The fourth logic valve 250 includes the control port 250C that communicates with the outlet port 252B of the fourth two position (on-off) solenoid valve 252. The fourth two position (on-off) solenoid valve 252 includes the inlet port 252A which is in fluid communication with the seventh branch 1320G of the manifold 1320 and the exhaust port 252C which is connected to the sump 102.

The first outlet port 250G communicates through the line 262 and the flow restricting orifice 1154 to the port 264A of the fourth shift actuator assembly 96B which includes the fourth cylinder or housing 264 and the fourth piston 266. The port 264B at the other end of the fourth cylinder 264 communicates through the line 268 to the third outlet port 250H.

When the fourth two position solenoid valve 252 is not energized, hydraulic fluid flows through the first and third outlet ports 250G and 250H as described, selecting third gear. When the fourth two position solenoid valve 252 is energized, the spool of the fourth logic valve 250 translates to the left, as illustrated in FIG. 6C, and pressurized hydraulic fluid flows through the second outlet port 250I in the line 272 and through the flow restricting orifice 1156 to the port 274A of the fifth shift actuator assembly 96C which includes the fifth cylinder or housing 274 and the fifth dual area piston 276. The port 274B at the other end of the cylinder or housing 274 communicates with the fourth outlet port 250J through the line 278. The fifth shift actuator assembly 96C engages, for example, first or reverse gear.

It should be appreciated that all of the pistons 1072A, 1082, 226, 266 and 276 may either be dual area pistons, if desired, or all single area pistons with associated feedback and control assemblies or combinations of the two, as illustrated.

It will also be appreciated that the hydraulic control systems according to various embodiments of the present invention achieve significant improvements in reduced energy consumption and shift performance not only because of the incorporation of the dedicated electric pump and accumulator but also because of the use of pressure and flow control solenoid valves which allow the majority of the hydraulic system components to be turned off in normal, steady-state, operation. Additionally, these solenoid valves and the linear position sensors on each piston and cylinder shift actuator assembly which provide real time data to the transmission control module regarding the instantaneous positions of the actuators, shift rails and clutches, achieve gear selection and clutch operation that is rapid, positive and efficient without overshoot and wasted energy.

Similarly, the configurations of the various embodiments and the position feedback provided by the linear position sensors permits and facilitates rapid gear sequencing and improved, i.e., reduced, shift times.

Finally, the separation of hydraulic fluid supply and control functions into two regions or sections corresponding to the odd and even gear selecting portions of the transmissions, reduces the likelihood of inaccurate or multiple gear selection and further improves efficiency by permitting shutting down the non-active region or section of the transmission during certain operating situations such as extended operation in the highest gear.

The description of the invention is merely exemplary in nature and variations that do not depart from the gist of the invention are intended to be within the scope of the invention. Such variations are not to be regarded as a departure from the spirit and scope of the invention.

What is claimed is:

1. A hydraulic control system for a dual clutch transmission comprising, in combination,
    a source of pressurized hydraulic fluid including a pump,
    a pair of pressure control solenoid valves having inputs communicating with said source of hydraulic fluid, a first output and second output independent of said first output,
    a pair of clutch actuator assemblies each in fluid communication with one of said outputs and including a piston and cylinder assembly and a solenoid valve for selectively supplying hydraulic fluid to said piston and cylinder assembly,
    a check valve assembly having a first inlet communicating with said first output, a second inlet communicating with said second output and a third output,
    a pressure or flow control solenoid valve having an inlet connected to said third output and a fourth output,
    a first logic valve having a first inlet connected to said fourth output and a second inlet connected to said third output, a plurality of exhaust ports, a control port, a first outlet, a second outlet, a third outlet and a fourth outlet,
    a second logic valve having a first inlet connected to said first outlet of said first logic valve, a second inlet connected to said third outlet of said first logic valve, a plurality of exhaust ports, a control port, a first outlet, a second outlet, a third outlet and a fourth outlet,
    a first gear selection piston and cylinder assembly having a first port connected to said first outlet of said second logic valve and a second port connected to said third outlet of said second logic valve,
    a second gear selection piston and cylinder assembly having a first port connected to said second outlet of said second logic valve and a second port connected to said fourth port of said second logic valve,
    a third logic valve having a first inlet connected to said second outlet of said first logic valve, a second inlet connected to said fourth outlet of said first logic valve, a plurality of exhaust ports, a control port, a first outlet, a second outlet, a third outlet and a fourth outlet,
    a third gear selection piston and cylinder assembly having a first port connected to said first outlet of said third logic valve and a second port connected to said third port of said second logic valve,
    a fourth gear selection piston and cylinder assembly having a first port connected to said second outlet of said third logic valve and a second port connected to said to said fourth port of said third logic valve.

2. The hydraulic control system of claim 1 further including a two position solenoid valve operably disposed between said source of hydraulic fluid and each of said control ports of said logic valves.

3. The hydraulic control system of claim 1 further including a fourth logic valve and a fifth gear selection piston and cylinder assembly.

4. The hydraulic control system of claim 1 further including a linear position sensor operably associated with each of said gear selection piston and cylinder assemblies.

5. The hydraulic control system of claim 1 further including a transmission control module having a plurality of inputs and outputs, said outputs operably coupled to said valves and a linear position sensor for sensing the position of each of said gear selection piston and cylinder assemblies and having an output coupled to one of said control module inputs.

6. The hydraulic control system of claim 1 wherein said logic valves each include a valve spool having a plurality of lands.

7. The hydraulic control system of claim 1 wherein said pump is an electrically powered constant volume pump.

8. The hydraulic control system of claim 1 wherein said check valve assembly includes a pair of symmetrically arranged check valves having check balls and springs.

9. A hydraulic control system for a dual clutch transmission comprising, in combination,
    a source of pressurized hydraulic fluid having a pump,
    a first pressure control solenoid valve having an inlet communicating with said source of hydraulic fluid and a first outlet,
    a second pressure control solenoid valve having an inlet communicating with said source of hydraulic fluid and a second outlet,
    a first clutch actuator assembly in fluid communication with said first outlet and including a first piston and cylinder assembly and a first solenoid valve for selectively supplying hydraulic fluid to said first piston and cylinder assembly,
    a second clutch actuator assembly in fluid communication with said second outlet and including a second piston and cylinder assembly and a second solenoid valve for selectively supplying hydraulic fluid to said second piston and cylinder assembly,
    a check valve assembly having a first inlet communicating with said first outlet, a second inlet communicating with said second outlet and a third outlet, a pressure or flow control solenoid valve having an inlet connected to said third outlet and a fourth outlet, a first logic valve having a first inlet connected to said fourth outlet of said first pressure or flow control solenoid and a second inlet connected to said third outlet of said check valve assembly, a plurality of exhaust ports, a control port, a first outlet, a second outlet, a third outlet and a fourth outlet, a second logic valve having a first inlet connected to said first outlet of said first logic valve, a second inlet connected to said third outlet of said first logic valve, a plurality of exhaust ports, a control port, a first outlet, a second outlet, a third outlet and a fourth outlet, a first gear selection piston and cylinder assembly having a first port connected to said first outlet of said second logic valve and a second port connected to said third outlet of said second logic valve, a second gear selection piston and cylinder assembly having a first port connected to said second outlet of said second logic valve and a second port connected to said fourth outlet of said second logic valve, a third logic valve having a first inlet connected to said second outlet of said first logic valve and a second inlet connected to said fourth outlet of said first logic valve, a plurality of exhaust ports, a control port, a first outlet, a second outlet, a third outlet and a fourth outlet, a third gear selection piston and cylinder assembly having a first port connected to said first outlet of said third logic valve and a second port connected to said third outlet of said third logic valve, a fourth logic valve having a first inlet connected to said second outlet of said third logic valve and a second inlet connected to said fourth outlet of said third logic valve, a plurality of exhaust ports, a control port, a first outlet, a second outlet, a third outlet and a fourth outlet, a fourth gear selection piston and cylinder assembly having a first port connected to said first outlet of said fourth logic valve and a second port connected to said third outlet of said fourth logic valve, and a fifth gear selection piston and cylinder assembly having a first port connected to said second outlet of said fourth logic valve and a second port connected to said fourth outlet of said fourth logic valve.

10. The hydraulic control system of claim 9 further including a linear position sensor operably associated with each of said gear selection piston and cylinder assemblies.

11. The hydraulic control system of claim 9 further including a transmission control module having a plurality of inputs and outputs, said outputs operably coupled to said valves and a linear position sensor for sensing the output of each of said gear selection piston and cylinder assemblies and having an output coupled to one of said control module inputs.

12. The hydraulic control system of claim 9 wherein said check valve assembly includes a pair of symmetrically arranged check valves having check balls and springs.

13. The hydraulic control system of claim 9 wherein said source of pressurized hydraulic fluid includes an accumulator, a filter, a check valve and an electric pump.

14. A hydraulic control system for a dual clutch transmission comprising, in combination, a source of pressurized hydraulic fluid having a pump, first means for regulating pressure having an inlet communicating with said source of hydraulic fluid and a first outlet, second means for regulating pressure having an inlet communicating with said source of hydraulic fluid and a second outlet, a first clutch actuator assembly in fluid communication with said first outlet and including a first piston and cylinder assembly and a first solenoid valve for selectively supplying hydraulic fluid to said first piston and cylinder assembly, a second clutch actuator assembly in fluid communication with said second outlet and including a second piston and cylinder assembly and a second solenoid valve for selectively supplying hydraulic fluid to said second piston and cylinder assembly, a check valve assembly having a first inlet communicating with said first outlet, a second inlet communicating with said second outlet and a third outlet, a pressure or flow control solenoid valve having an inlet connected to said third outlet and a fourth outlet, a first logic valve having a first inlet connected to said fourth outlet of said first pressure or flow control solenoid and a second inlet connected to said third outlet of said check valve assembly, a plurality of exhaust ports, a control port, a first outlet, a second outlet, a third outlet and a fourth outlet, a second logic valve having a first inlet connected to said first outlet of said first logic valve, a second inlet connected to said third outlet of said first logic valve, a plurality of exhaust ports, a control port, a first outlet, a second outlet, a third outlet and a fourth outlet, a first gear selection piston and cylinder assembly having a first port connected to said first outlet of said second logic valve and a second port connected to said third outlet of said second logic valve, a second gear selection piston and cylinder assembly having a first port connected to said second outlet of said second logic valve and a second port connected to said fourth outlet of said second logic valve, a third logic valve having a first inlet connected to said second outlet of said first logic valve and a second inlet connected to said fourth outlet of said first logic valve, a plurality of exhaust ports, a control port, a first outlet, a second outlet, a third outlet and a fourth outlet, a third gear selection piston and cylinder assembly having a first port connected to said first outlet of said third logic valve and a second port connected to said third outlet of said third logic valve, a fourth logic valve having a first inlet connected to said second outlet of said third logic valve and a second inlet connected to said fourth outlet of said third logic valve, a plurality of exhaust ports, a control port, a first outlet, a second outlet, a third outlet and a fourth outlet, a fourth gear selection piston and cylinder assembly having a first port connected to said first outlet of said fourth logic valve and a second port connected to said third outlet of said fourth logic valve, and a fifth gear selection piston and cylinder assembly having a first port connected to said second outlet of said fourth logic valve and a second port connected to said fourth outlet of said fourth logic valve.

15. The hydraulic control system of claim 14 wherein said means for regulating pressure is a feed limit valve assembly having a solenoid.

16. The hydraulic control system of claim 14 further including a linear position sensor operably associated with each of said gear selection piston and cylinder assemblies.

17. The hydraulic control system of claim 14 further including a transmission control module having a plurality of inputs and outputs, said outputs operably coupled to said valves and a linear position sensor for sensing the output of each of said gear selection piston and cylinder assemblies and having an output coupled to one of said control module inputs.

18. The hydraulic control system of claim 14 wherein said check valve assembly includes a pair of symmetrically arranged check valves having check balls and springs.

19. The hydraulic control system of claim 14 further including a plurality of two position solenoid valves each having an inlet port communicating with one of said first and second outlets and outlets communicating with said control ports of said logic valves.

* * * * *